United States Patent [19]

Imaizumi et al.

[11] Patent Number: 5,430,832
[45] Date of Patent: Jul. 4, 1995

[54] IMAGE EDITING APPARATUS MAKING A FUNCTION OF TRIMMING AN AREA FROM AN IMAGE DISPLAYED ON A SCREEN

[75] Inventors: Shoji Imaizumi, Shinshiro; Kenichi Muroki; Keiji Kusumoto, both of Toyokawa, all of Japan

[73] Assignee: Minolta Camera Kabushiki Kaisha, Osaka, Japan

[21] Appl. No.: 978,287

[22] Filed: Nov. 18, 1992

[30] Foreign Application Priority Data

Nov. 20, 1991 [JP] Japan ................ 3-304332
Mar. 31, 1992 [JP] Japan ................ 4-077133
Apr. 3, 1992 [JP] Japan ................ 4-081225
May 18, 1992 [JP] Japan ................ 4-124426

[51] Int. Cl.⁶ ............................ G06T 15/30
[52] U.S. Cl. ........................ 395/134; 395/133; 395/135
[58] Field of Search ........... 395/133, 134, 135, 138, 395/139, 145, 146, 147, 148, 155, 161; 358/224, 296, 451, 462, 479, 527; 345/112-120, 127-131

[56] References Cited

U.S. PATENT DOCUMENTS

| | | | |
|---|---|---|---|
| 4,496,983 | 1/1985 | Takenaka | 358/451 |
| 4,694,354 | 9/1987 | Tanaka et al. | 358/296 |
| 4,837,635 | 6/1989 | Santos | 358/401 |
| 4,907,095 | 3/1990 | Komura et al. | 358/451 |
| 5,172,234 | 12/1992 | Arita et al. | 358/224 |
| 5,177,624 | 1/1993 | Sato | 358/462 |

Primary Examiner—Almis R. Jankus
Attorney, Agent, or Firm—Willian Brinks Hofer Gilson & Lione

[57] ABSTRACT

The image display apparatus includes an input image display control portion for displaying an input image on a screen of a display apparatus, a trimming area setting portion for setting or changing a trimming area with respect to the image, a frame display control portion for displaying a trimming frame indicating the trimming area over the image on the screen of the display apparatus, a confirmation input portion for outputting a signal for confirming the trimmed image which is the image in the trimming area, and a confirmation display control portion for displaying the trimmed image as a confirmation display on the screen of the display apparatus in response to a signal from the confirmation input portion. After the confirmation display is given, the image and the trimming frame are displayed on the screen of the display apparatus in response to a signal from a change input portion, and the change of the trimming area by the trimming area setting portion becomes possible.

16 Claims, 41 Drawing Sheets

35mm FILM
SHEET ASPECT RATIO > 0.666

35mm FILM
SHEET ASPECT RATIO ≤ 0.666

6cm FILM
SHEET ASPECT RATIO < 1.33

6cm FILM
SHEET ASPECT RATIO ≥ 1.33

4 x 5 inch FILM
SHEET ASPECT RATIO < 0.8

4 x 5 inch FILM
SHEET ASPECT RATIO ≥ 0.8

FIG.17

| | A | B | C | D | E | F | G |
|---|---|---|---|---|---|---|---|
| 1 | | | | | | | |
| 2 | OUTPUT SHEET | SHEET SIZE LENGTH | SHEET SIZE WIDTH | DISPLAY RATIO | PRINT PERMMITING AREA LENGTH | PRINT PERMMITING AREA WIDTH | ASPECT RATIO |
| 3 | A3T | 297 | 420 | 1 | 291 | 409 | 0.711 |
| 4 | A4T | 210 | 297 | 0.707 | 204 | 286 | 0.713 |
| 5 | A5T | 148 | 210 | 0.5 | 142 | 199 | 0.713 |
| 6 | B4T | 257 | 364 | 0.866 | 251 | 353 | 0.711 |
| 7 | B5T | 182 | 257 | 0.611 | 176 | 246 | 0.715 |
| 8 | A4Y | 297 | 210 | 0.5 | 291 | 199 | 1.462 |
| 9 | A5Y | 210 | 148 | 0.352 | 204 | 137 | 1.489 |
| 10 | B5Y | 257 | 182 | 0.433 | 251 | 171 | 1.467 |
| 11 | LETTER | 216 | 279 | 0.664 | 210 | 268 | 0.783 |
| 12 | LEGAL | 216 | 356 | 0.847 | 210 | 345 | 0.608 |

FIG.18

| 35 mm | | | | | | | | | |
|---|---|---|---|---|---|---|---|---|---|
| OUTPUT SHEET | ASPECT RATIO | $Xt_1$ | $Xt_2$ | $Yt_1$ | $Yt_2$ | $FXt_1$ | $FXt_2$ | $FYt_1$ | $FYt_2$ |
| A 3 T | 0.7115 | 1 | 300 | 15 | 438 | 1 | 4096 | 195 | 5950 |
| A 4 T | 0.7133 | 1 | 300 | 16 | 435 | 1 | 4096 | 202 | 5943 |
| A 5 T | 0.7136 | 1 | 300 | 16 | 435 | 1 | 4096 | 203 | 5942 |
| B 4 T | 0.7110 | 1 | 300 | 15 | 438 | 1 | 4096 | 193 | 5952 |
| B 5 T | 0.7154 | 1 | 300 | 16 | 435 | 1 | 4096 | 210 | 5935 |
| A 4 Y | 1.4623 | 1 | 300 | 123 | 328 | 1 | 4095 | 1672 | 4473 |
| A 5 Y | 1.4891 | 1 | 300 | 125 | 326 | 1 | 4096 | 1698 | 4447 |
| B 5 Y | 1.4678 | 1 | 300 | 124 | 327 | 1 | 4096 | 1678 | 4467 |
| LETTER | 0.7836 | 1 | 300 | 35 | 416 | 1 | 4096 | 459 | 5686 |
| LEGAL | 0.6087 | 13 | 287 | 1 | 450 | 178 | 3918 | 1 | 6144 |

| 6 x 4.5 cm | | | | | | | | | |
|---|---|---|---|---|---|---|---|---|---|
| OUTPUT SHEET | ASPECT RATIO | $Xt_1$ | $Xt_2$ | $Yt_1$ | $Yt_2$ | $FXt_1$ | $FXt_2$ | $FYt_1$ | $FYt_2$ |
| A 3 T | 0.7115 | 72 | 229 | 115 | 336 | 969 | 3128 | 1555 | 4590 |
| A 4 T | 0.7133 | 72 | 229 | 115 | 336 | 966 | 3131 | 1555 | 4590 |
| A 5 T | 0.7138 | 72 | 229 | 115 | 338 | 966 | 3131 | 1555 | 4590 |
| B 4 T | 0.7110 | 72 | 229 | 115 | 338 | 970 | 3127 | 1555 | 4590 |
| B 5 T | 0.7154 | 71 | 230 | 115 | 336 | 963 | 3134 | 1555 | 4590 |
| A 4 Y | 1.4623 | 1 | 300 | 123 | 328 | 1 | 4096 | 1672 | 4473 |
| A 5 Y | 1.4891 | 1 | 300 | 125 | 326 | 1 | 4098 | 1698 | 4447 |
| B 5 Y | 1.4678 | 1 | 300 | 124 | 327 | 1 | 4096 | 1678 | 4467 |
| LETTER | 0.7836 | 64 | 237 | 115 | 336 | 860 | 3237 | 1555 | 4590 |
| LEGAL | 0.6087 | 83 | 218 | 115 | 336 | 1125 | 2972 | 1555 | 4590 |

| 4 x 5 inch | | | | | | | | | |
|---|---|---|---|---|---|---|---|---|---|
| OUTPUT SHEET | ASPECT RATIO | $Xt_1$ | $Xt_2$ | $Yt_1$ | $Yt_2$ | $FXt_1$ | $FXt_2$ | $FYt_1$ | $FYt_2$ |
| A 3 T | 0.7115 | 14 | 287 | 38 | 413 | 183 | 3914 | 450 | 5695 |
| A 4 T | 0.7133 | 14 | 287 | 38 | 413 | 178 | 3919 | 450 | 5695 |
| A 5 T | 0.7136 | 14 | 287 | 38 | 413 | 177 | 3920 | 450 | 5695 |
| B 4 T | 0.7110 | 14 | 287 | 38 | 413 | 184 | 3913 | 450 | 5695 |
| B 5 T | 0.7154 | 14 | 287 | 38 | 413 | 172 | 3925 | 450 | 5695 |
| A 4 Y | 1.4823 | 1 | 300 | 123 | 328 | 1 | 4096 | 1672 | 4473 |
| A 5 Y | 1.4891 | 1 | 300 | 125 | 326 | 1 | 4096 | 1698 | 4447 |
| B 5 Y | 1.4878 | 1 | 300 | 124 | 327 | 1 | 4096 | 1678 | 4467 |
| LETTER | 0.7836 | 1 | 300 | 35 | 416 | 1 | 4096 | 459 | 5686 |
| LEGAL | 0.6087 | 34 | 267 | 38 | 413 | 452 | 3645 | 450 | 5695 |

FIG.19

| FILM TYPE | FILM IMAGE DIMENSION IN MAIN SCANNING DIRECTION | FILM IMAGE DIMENSION IN SUB SCANNING DIRECTION | IMAGE DIMENSION RATIO | DISPLAY AREA ON SCREEN | | | | SCOPE OF FILM IMAGE READING | | | |
|---|---|---|---|---|---|---|---|---|---|---|---|
| | | | | MAIN SCANNING DIRECTION | | SUB SCANNING DIRECTION | | MAIN SCANNING DIRECTION | | SUB SCANNING DIRECTION | |
| | | | | Xt1 | Xt2 | Yt1 | Yt2 | FXt1 | FXt2 | FYt1 | FYt2 |
| 35mm FILM | 24 | 36 | 0.667 | 1 | 300 | 1 | 450 | 1 | 4096 | 1 | 6144 |
| 6 × 4.5 FILM | 56 | 41.5 | 1.349 | 1 | 300 | 115 | 336 | 1 | 4096 | 1555 | 4590 |
| 6 × 6 FILM | 56 | 56 | 1.000 | 1 | 300 | 76 | 375 | 1 | 4096 | 1025 | 5120 |
| 6 × 7 FILM | 56 | 69 | 0.812 | 1 | 300 | 40 | 411 | 1 | 4096 | 550 | 5595 |
| 6 × 9 FILM | 56 | 82.5 | 0.679 | 1 | 300 | 4 | 447 | 1 | 4096 | 56 | 6089 |
| 4"× 5" FILM | 89 | 114 | 0.781 | 1 | 300 | 38 | 413 | 1 | 4096 | 450 | 5895 |

IMAGE EDITING APPARATUS MAKING A FUNCTION OF TRIMMING AN AREA FROM AN IMAGE DISPLAYED ON A SCREEN

BACKGROUND OF THE INVENTION

1. Field of the Invention

The present invention relates to an image editing apparatus and, more particularly, to an image editing apparatus used, for example, as a film scanner which reads images on a photo film and outputs image signals, and to an image forming apparatus for forming hard copy images corresponding to original images, such as a copying machine and a facsimile apparatus.

2. Description of the Related Art

A film scanner is an apparatus for optically reading original images (hereinafter referred to as "film images") of a photo film (hereinafter referred to as a "film") and outputting image signals, and it is adapted to allow edition of images such as trimming (extraction of a portion of the image), expansion or reduction of the read film image.

Generally, such a film scanner is used combined with a color printer and based on the image signals output from the film scanner, a hard copy image corresponding to the film image is formed.

The process for carrying out trimming in a conventional film scanner is as follows. First, for setting a trimming area, an operator depresses a trimming key on an operation panel with the film image displayed on a screen of a display apparatus. Then, a trimming mode is set and a frame line (hereinafter referred to as "trimming frame") indicating the contour of the trimming area is displayed overlapped with the film image at the central portion of the screen.

Then, the operator changes the setting so that the trimming area is located at a desired position and has a desired size by using a key for designating expansion or reduction of the trimming area and four keys for moving the trimming area upward, downward, to the right and to the left, while monitoring the display on the screen.

Then, when the operator depresses a key for designating output of the image signal, the image signal of the trimmed image is output, and a hard copy image is formed on an output sheet based thereon.

In this manner, in the conventional film scanner, a display for trimming edition including the film image and trimming frame is displayed on a screen of a display apparatus during trimming operation, and the trimming area is determined on this screen.

Therefore, in the prior art, there is no image displayed on the screen indicating the trimmed image only for confirmation, and therefore the operator must depend on the screen on which the whole film image and the trimming frame are displayed in order to confirm whether or not the desired trimming is actually realized by the set trimming area. Since the trimmed image is generally small, it is still more difficult to confirm the state of the images near the periphery of the trimming frame.

Accordingly, even if unnecessary image is left in the trimming frame, the operator may not notice the unnecessary image on the screen and the unnecessary image may be noticed only after the hard copy is done, resulting in an unsuccessful copy or a miscopy.

Films to be read are successively set at the film image reading position of the film scanner. However, the position of setting is not accurate and there is some deviation at every setting of the film.

Therefore, if an area having the same size as the image area of the film image is read, non-image area around the film image may be read because of the positional deviation of the film, which causes image noise. Therefore, in the prior art, an area having little smaller size than the image area is read in consideration of the positional deviation of the film.

For this reason, the input image provided by reading has peripheral portions of the original image area missed, and complete film image could not be input.

A possible solution of this problem is to read an area little larger than the size of the image area so that the whole images in the image area are encompassed, to trim the input image obtained by reading so as to extract only the images in the image area and to remove image noise.

However, in that case, a trimming area having the same size as the image area of the film image must be set and such troublesome operation must be carried out every time the film image is read. Especially when various films of different types (sizes) are to be read, trimming areas having different sizes must be set every time, which operation requires much time and labor.

Conventionally, in a film print apparatus including a film scanner and a page printer, images are automatically magnified (expanded or reduced) corresponding to the size of the sheet at the time of trimming. More specifically, the film print apparatus prints the image (trimmed image) corresponding to the trimming area designated by the operator (user) as large as possible on the sheet.

At this time, magnification in the main scanning direction of reading of the film image is generally implemented by signal processing of repeating or skipping the pixels (a so called electric magnification), while magnification in the subscanning direction is implemented by changing the speed of scanning in reading the film image.

A hard copy image subjected to electric magnification becomes coarse (with lower resolution) as the rate of magnification is increased. If magnification is done by changing the speed of scanning and the speed of scanning is very much different from the speed at the time of equal speed magnification, the hard copy image may be disturbed because of the missynchronization with the page printer.

Therefore, when a very small trimming area is designated, for example, the image quality of the hard copy image may not always what is expected by the operator. However, the operator can not predict the image quality. In such a case, it is desired that the designation of the trimming area is changed to avoid such non-expected printing, or a misprint (miscopy). However, in the prior art, such determination was impossible.

Conventionally, when a trimming area is set, indication suggesting the relation between the size of the trimming area and the size of the output sheet is not provided. Therefore, the trimming area is set without considering the relation with the size of the output sheet.

Therefore, generally, the trimming area and the output sheet are not similar figures. Even if magnification is done such that the length or width of the trimmed image corresponds to the full area allowing printing of the output sheet, the hard copy image formed on the output sheet may not be fully formed on the area allowing printing of the output sheet, causing blank portion in the lengthwise or widthwise direction of the output sheet.

The aspect ratio of a film image is generally 1:15, 1:1.25 or the like which is different from the aspect ratio of 1:41 of generally used output sheets (of standard size), and therefore the aforementioned blank is inevitably generated.

SUMMARY OF THE INVENTION

An object of the present invention is to improve convenience in use of an image editing apparatus having the function of trimming.

Another object of the present invention is to prevent generation of miscopies in an image editing apparatus having the function of trimming.

A further object of the present invention is to facilitate confirmation of the state of trimming in an image editing apparatus having the function of trimming.

A still further object of the present invention is to facilitate change of the scrape of trimming in an image editing apparatus having the function of trimming.

The above described objects are attained by the image editing apparatus in accordance with one aspect of the present invention having the function of trimming an arbitrary area out of an image displayed on a screen, including a display screen for displaying an image, first display means for displaying a trimming frame over the image displayed on the display screen, and second display means for displaying in enlargement the image surrounded by the trimming frame.

In the image editing apparatus structured as described above, the image surrounded by the trimming frame is displayed in enlargement. Therefore, the state of trimming can be easily confirmed, which improves convenience in use.

The above described objects are attained by the image editing apparatus in accordance with another aspect of the present invention having the function of trimming an arbitrary area of an image displayed on a screen, including image reading means for reading the original image, detecting means for detecting the size of the original image, a display screen for displaying the image provided by reading, setting means for setting the trimming function, display means for displaying, when the trimming function is set, a trimming frame corresponding to the size of the original image detected by the detecting means on the display screen, and moving means for moving the trimming frame displayed by the display means.

In the image editing apparatus structured as described above, a trimming frame corresponding to the size of the original image is displayed and the frame is freely moved, and therefore the scope of trimming can be easily changed, improving convenience in use.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 17 shows the areas allowing printing and aspect ratios of various output sheets in accordance with one embodiment of the present invention.

FIG. 18 shows coordinates of the trimming frames based on the default values and pixel addresses on the film of the screen in accordance with the combination of the film size and the aspect ratio of the various output sheets in accordance with one embodiment of the present invention.

FIG. 19 shows aspect ratios and display areas of various films in accordance-with one embodiment of the present invention.

DESCRIPTION OF THE PREFERRED EMBODIMENTS

Figure 1:
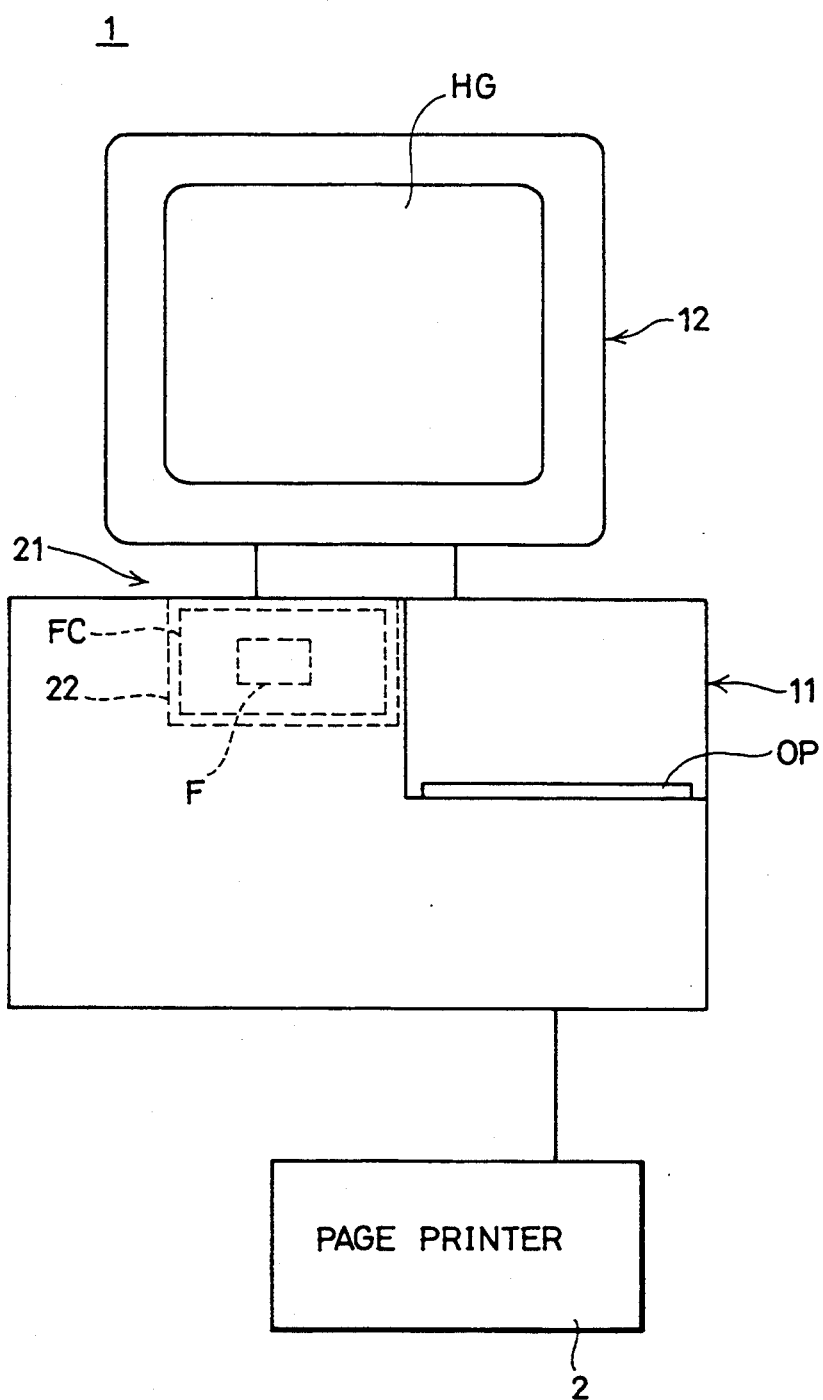
FIG. 1 is a front view showing the appearance of a film scanner in accordance with one embodiment of the present invention.
Figure 2:
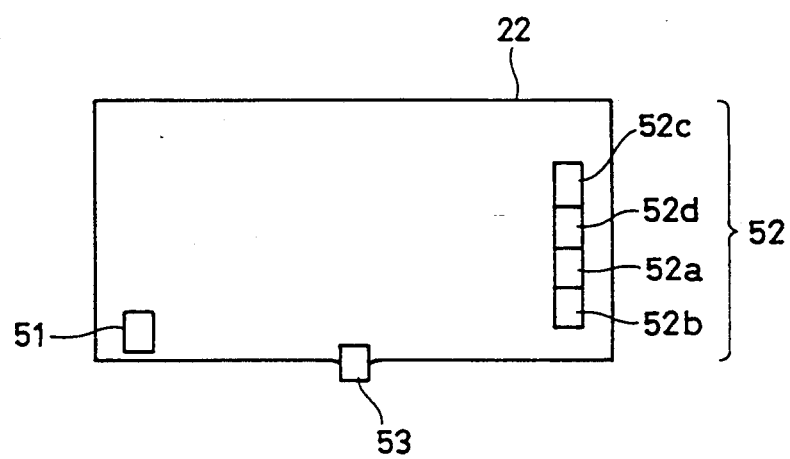
FIG. 2 is a front view of a track provided at the body of the film scanner of FIG. 1.
Figure 3A:
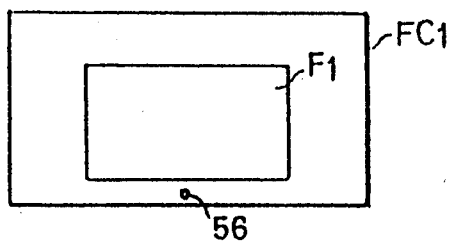
FIG. 3 is a front view of various film carriers attached to the film scanner of FIG. 1.
Figure 3B:
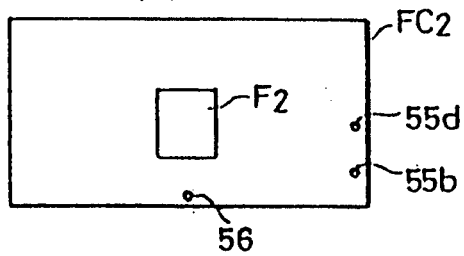
Figure 3C:
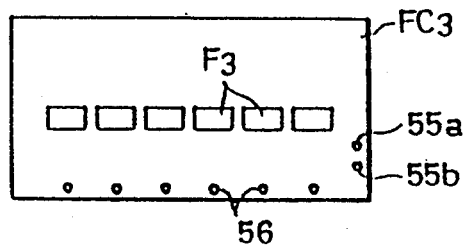
Figure 3D:
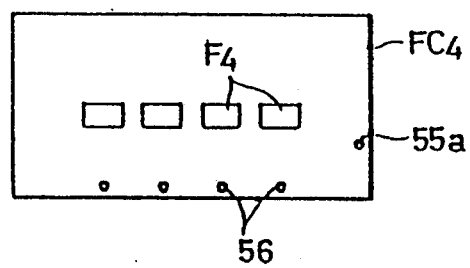
Figure 3E:
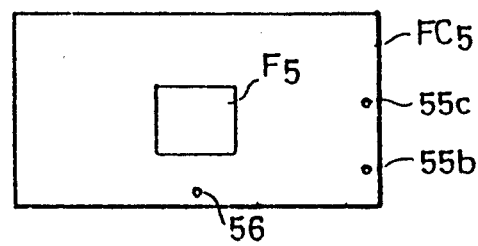
Figure 3F:
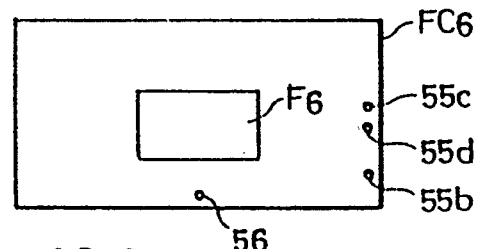
Figure 3G:
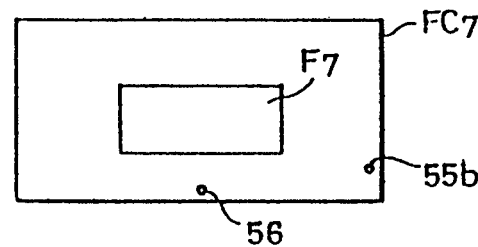
Figure 4:
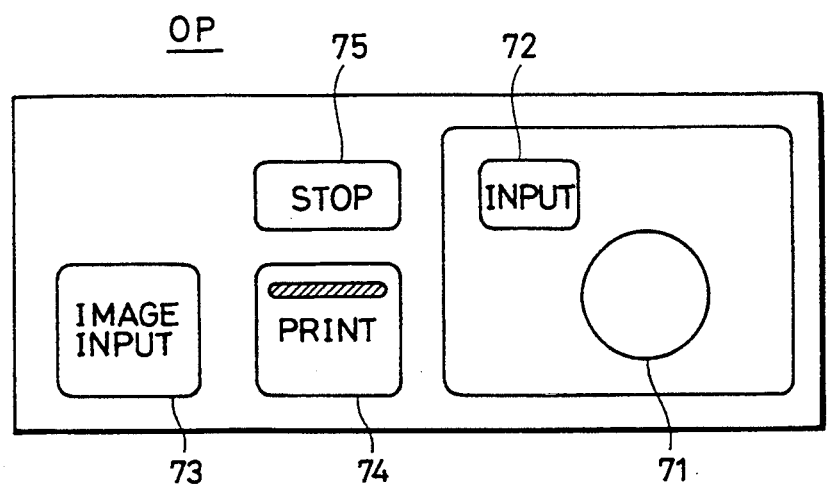
FIG. 4 is a front view of a scanning panel of FIG. 1.
Figure 5:
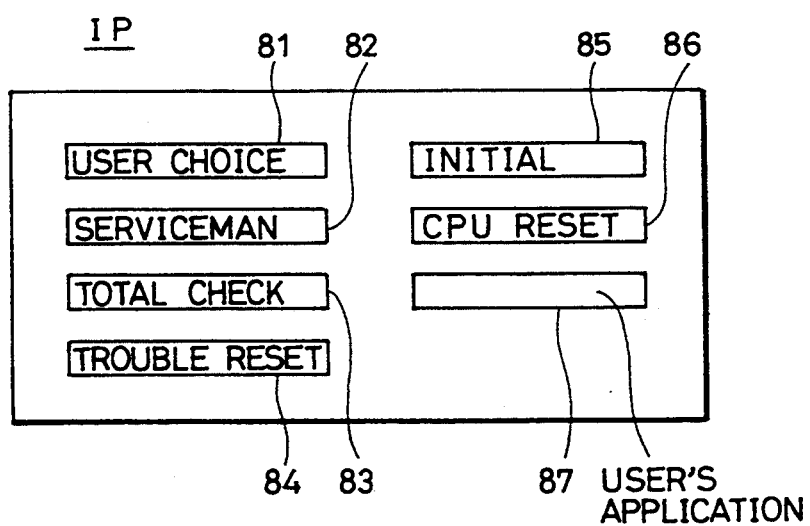
FIG. 5 is a front view of an inner panel attached to the film scanner of FIG. 1.

FIG. 1 is a front view showing the appearance of the film scanner 1 in accordance with the present invention, FIG. 2 is a front view of the truck 22 provided on a body 11 of the film scanner 1, FIG. 3 is a front view of various film carriers FC, FIG. 4 is a front view of an operation panel OP, FIG. 5 is a front view of an internal panel IP and FIG. 6 shows an example of display of a screen HG.

A film scanner 1 having a page printer 2 connected thereto includes a body 11 in which optical system for reading the film image and control portion for processing the image data are arranged, and a display apparatus 12 for displaying the read image on the screen HG. An operation panel OP is provided at the top surface of the body 11.

At a film loading portion 21 provided at an upper portion of the body 11, a truck 22 is positioned movable in left and right directions, and a film carrier FC loading a film F is inserted in the truck 22.

As shown in FIG. 2, a carrier detecting sensor 51 for detecting whether or not there is a film carrier FC and a type detecting sensor 52 (52a to 52d) for detecting the type of the film carrier FC are provided in the truck 22. A position detecting sensor 53 for detecting the position of the film carrier FC through a hole provided at the truck 22 is provided at the body 11. Transmission photosensors, for example, are used for these sensors.

As for the film carriers FC, there are a film carrier FC 1 for a film F1 having the size of $4 \times 5$ inches, a film carrier FC2 for a film F2 having the size of $6 \times 4.5$ cm, a film carrier FC3 for a continuous film F3 of 35 mm size and a film carrier FC4 for a mount film F4 of 35 mm size as shown in FIG. 3(a) to (d) as well as film carriers FC5 to FC7 for films F5 to F7 having the sizes of $6 \times 6$, $6 \times 7$ and $6 \times 9$ cm as shown in FIG. 3(e) to (g), which are used for the film of 6 cm size in addition to the film carrier FC2 shown in FIG. 3(b). Namely, there are a total of seven film carriers.

These film carriers FC each have a type detecting hole 55 (55a to 55d) for detecting the type and a position detecting hole 56 for positioning the film F.

As shown in FIG. 4, on the operation panel OP, a track ball 71 for moving a cursor displayed on the screen HG, an enter key 72 for an input through a button Z designated by the cursor, an image input key 73 for reading the film image to be displayed on the screen HG, a print key 74 for designating printing by the external color printer and a stop key 75 for stopping reading of image and printing are arranged.

In the body 11, an inner panel IP operable when a cover, not shown, is opened is provided.

On the internal panel IP, a user choice key 81 for designating setting of a mode selected by the user, a service man key 82 for designating setting of a mode set by a service man, a total check key 83 designating indication of the number of prints in total, a trouble reset key 84 for releasing a trouble state, an initial key 85 for initialization, a CPU reset key 86 for setting the CPU and a user application code key 87 indicating user's application are provided, as shown in FIG. 5.

Figure 6A:
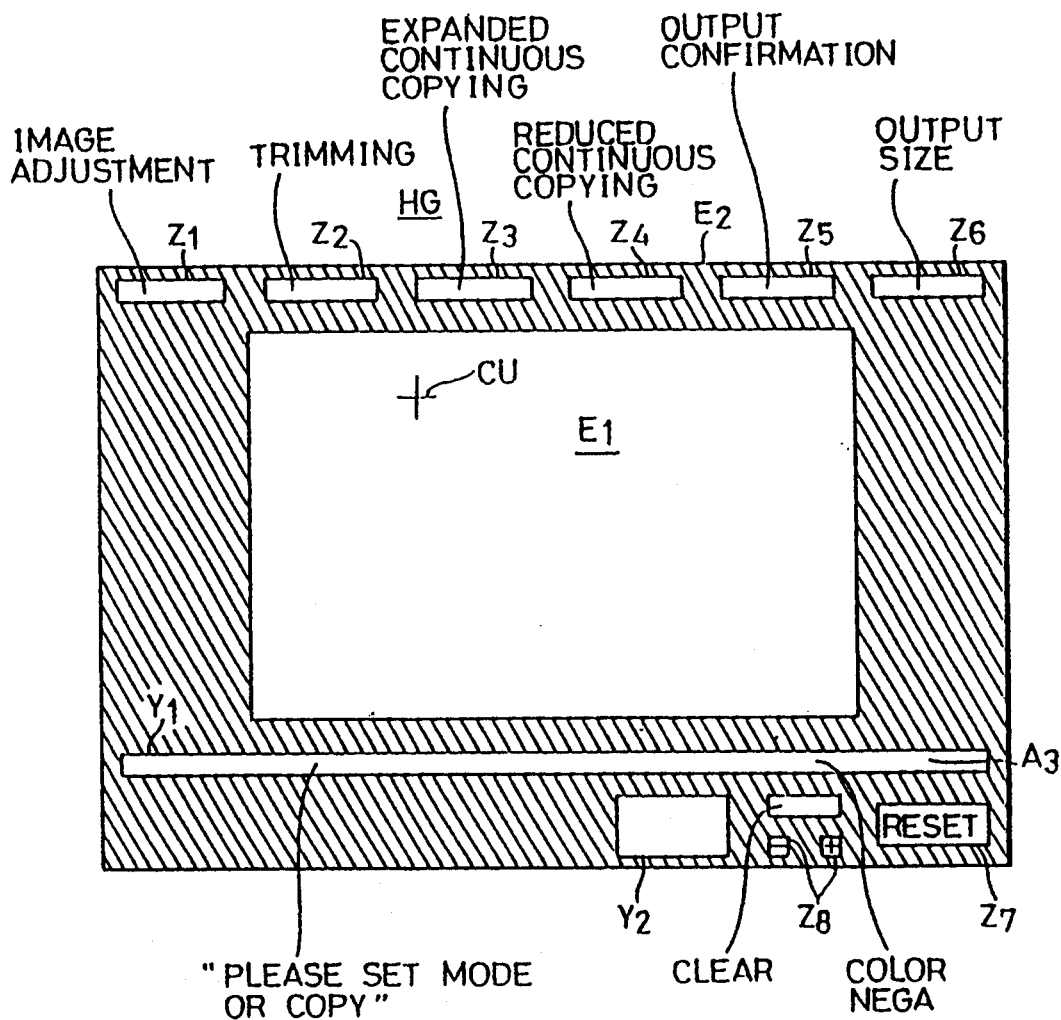
FIG. 6 shows an example of display on the screen of the film scanner of FIG. 1.

Various buttons Z for operation are displayed on the screen HG of the display apparatus 12. As shown in FIG. 6(a), the screen HG is basically formed of a central image displaying area E1 and a peripheral display area E2 for operation.

At the initial state after the power is turned on, the image display area E1 is a blank. When the film image is read by depressing (turning on) the image input key 73, the film image or the edited image is displayed. Various buttons Z and indicating portions Y are displayed on the display area E2 for operation. The functions of the buttons Z and the indicating portions Y shown in FIG. 6(a) are as follows.

By an image adjusting button Z1, a submenu is displayed, allowing image adjustment such as color balance. By a trimming button Z2, a trimming mode is set. By an enlarged successive copying button Z3, an enlarged continuous copying mode is set, and the output size can be set by the submenu. By a reduced continuous copying button Z4, a reduced continuous copying mode is set. By an output confirming button Z5, a display for confirmation confirming the relation between the image to be printed out and the sheet is displayed. By an output size button Z6, a submenu for setting the sheet size of the printer is displayed. By a reset button Z7, the set mode is released and the apparatus is initialized. By a copy number setting button Z8, the number of prints (the number of copies) is set.

In the expanded continuous copying mode, one film image is expanded and printed out on a plural sheets. In the reduced continuous copying mode, a plurality of identical film images or trimmed images are printed out one after another on one sheet.

On a message indicating portion Y1, the type of the film F loaded, the size of the sheet for printing out, and other messages are indicated. The number of printing is shown at the copy number indicating portion Y2.

Figure 6B:
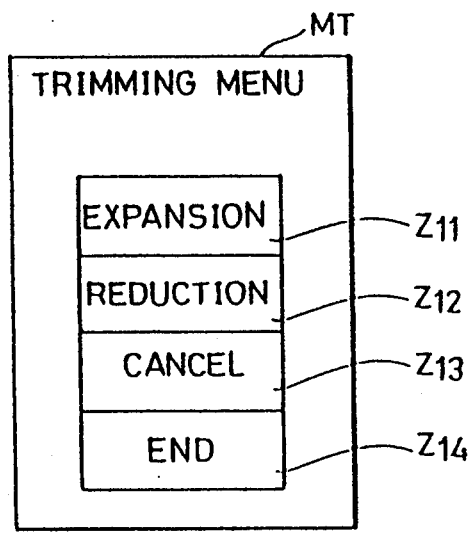

At a space on the right side of the display area E2 for operation, a button Z of a submenu shown in FIG. 6(b) may be indicated. The buttons Z11 to Z14 will be described later.

On the screen HG, a cursor CU is displayed as well as the images and the buttons Z. The operator moves the cursor CU at a desired point on the screen HG by means of a track ball 71 on the operation panel OP and by designating the position by turning on the enter key 72, input through the button Z or designation of area of the image can be done.

Although not shown, the optical system contained in the body 11 includes a lamp unit having a halogen lamp, a plurality of mirrors moved in the subscanning direction for scanning, a fixed mirror, lenses, an optical filter and a one dimensional image sensor IS including CCD arrays for reading the film image by color-separating the same to three colors, that is, R, G and B.

Figure 7:
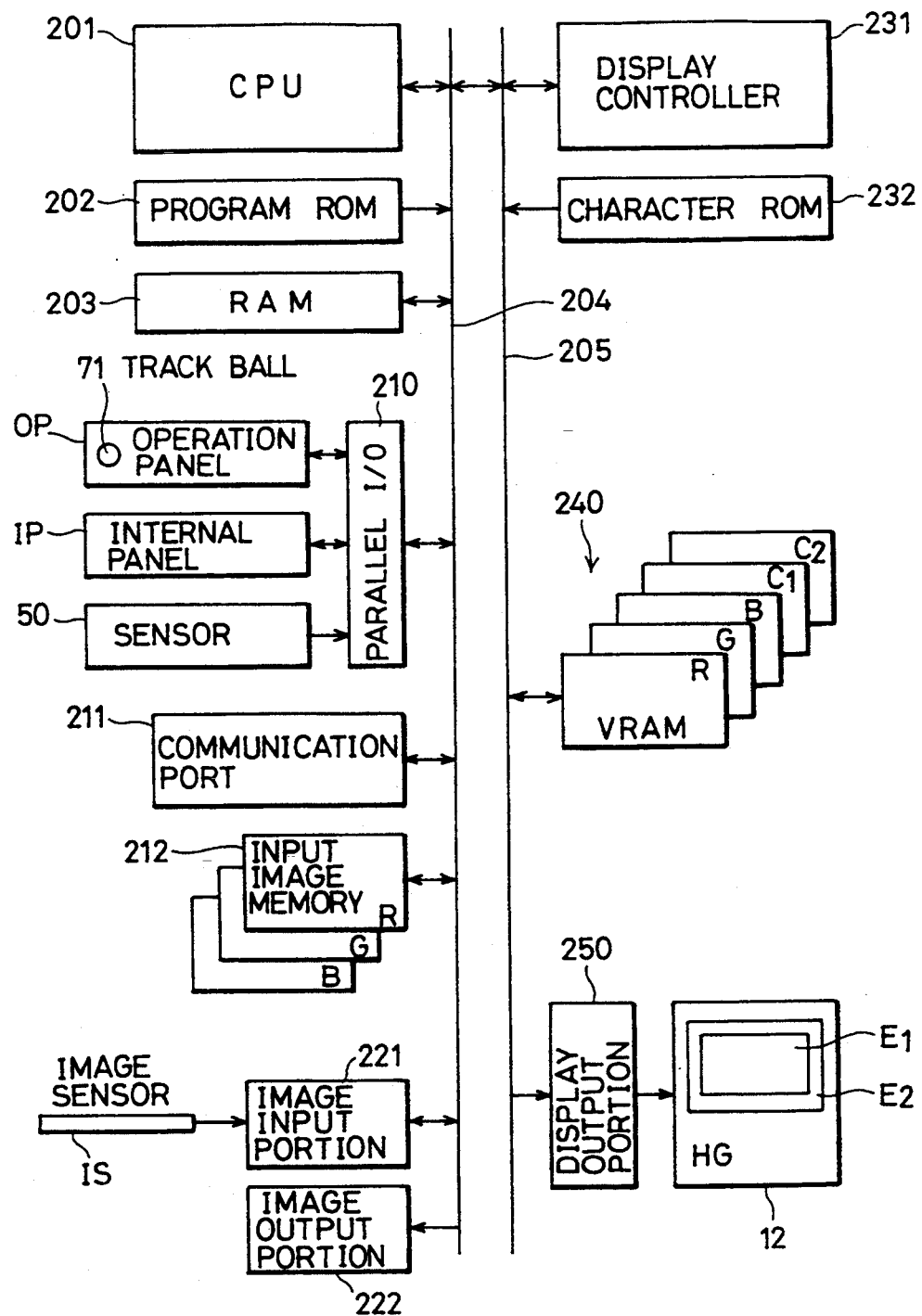
FIG. 7 is a block diagram showing the structure of a control portion of the film scanner shown in FIG. 1.

FIG. 7 is a block diagram showing a structure of control portion 200 of the film scanner 1.

The control portion 200 includes a CPU 201 controlling the film scanner 1 as a whole, and a display controller (AGDC) 231 for controlling the images displayed by the display apparatus 12.

Through a CPU data bus 204, to the CPU 201 connected are: a program ROM 202 storing control program; a RAM 203 for temporarily storing variables and other data necessary for executing the program; an input/output interface 210 for inputting and outputting signals; a communication port 211 for communication with the printer; an image input portion 221 for input processing of the image signals read by the image sensor IS; an input image memory 212 for storing image data input by the image input portion 221; an image output portion 222 for carrying out editing process of the image data for printing out, and so on. The operation panel OP, the internal panel IP, various sensors 50, driving circuits of the motor, the filter, the lens and of the mirror, a lamp control circuit and other circuits are connected to the input/output interface 210.

A character ROM 232, a VRAM (Video RAM) 240, a display output portion 250 for carrying out edition of image data stored in the VRAM 240 for displaying on the display apparatus 12 are connected through an AGDC data bus 205 to the display controller 231.

The VRAM 240 includes three image planes for color-separated R, G and B image data and two character planes C1 and C2 for fixed indicators such as buttons Z and for the mobil indicators such as the cursor and the trimming frame. The VRAM 240 includes a total of 5 planes.

Image data stored in the input image memory 212 are transferred under the control of the display controller 231 to respective image planes of R, G and B of the VRAM 240 and, at that time, the image data is expanded, reduced or a portion of the image data is extracted in accordance with the instruction from the CPU 201.

Figure 8:
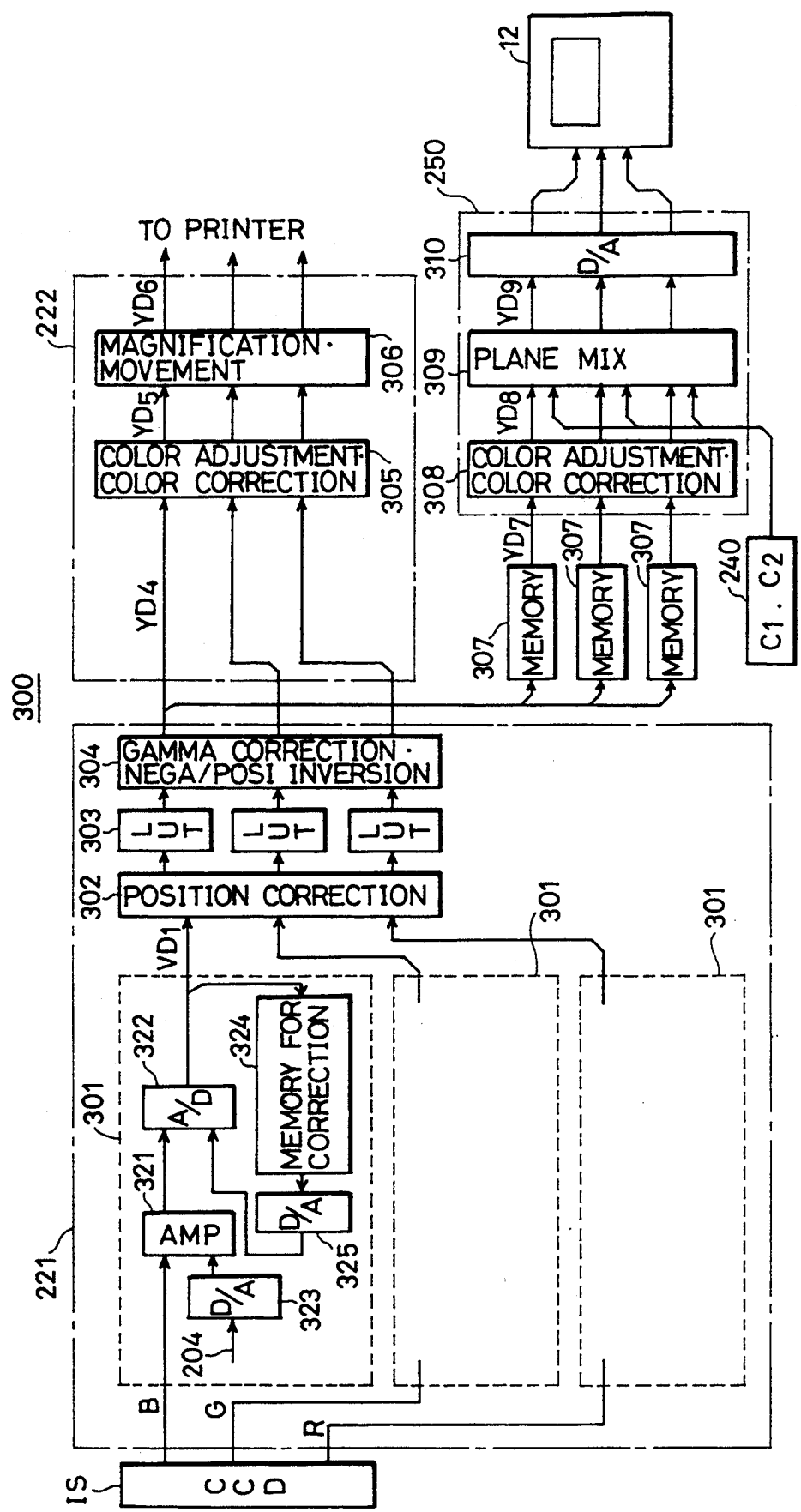
FIG. 8 is a block diagram showing an image processing portion in the control portion of FIG. 7 along the flow of data

FIG. 8 is a block diagram showing the image processing portion 300 of the control portion 200 along the flow of data.

The image processing portion 300 includes the above mentioned image input portion 221, the image output portion 222, the display output portion 250 and the memory 307.

The image input portion 221 includes an amplifying and converting portion 301 for the image signals of respective colors R, G and B, a position correcting portion 302, a look up table 303 and a gamma correcting portion 304.

The amplifying converting portion 301 includes a video amplifier 321 the rate of amplification of which is set by a voltage signal output from a DA converter 323, an AD converter 322 for converting into image data by quantization, a DA converter 325 applying a reference voltage to the AD converter 322 and a correcting memory 324 for outputting data for shading correction to the DA converter 325 in synchronization with pixel clocks.

Data related to the rate of amplification is input to the DA converter 323 from the CPU 201 through the CPU data bus 204. As for the data, maximum and minimum values of each color component of R, G and B are extracted in advance based on the prescribed number of image data read by preliminary scanning, with the rate of amplification set at a prescribed value. The rate of amplification providing the maximum value at a prescribed value is calculated from the extracted maximum value, and the calculated rate of amplification is set. In this manner, difference in conditions for exposure and sensitivity of respective colors, that is, R, G and B dependent on the types of the film F can be corrected by the video amplifier 321.

The position correcting portion 302 corrects the positional deviation between R, G and B of the image sensors IS. More specifically, the pixel trains of R, G and B are arranged parallel to each other with prescribed interval therebetween in the image sensor IS, and therefore positional registration is done by delaying the image data by the amount corresponding to that interval.

Data is written from the CPW 201 through the CPU data bus 204 to the look up table 303, and normalization for making constant amplitude of the output data with respect to the input data. By making the operation accordant with the operation of the aforementioned video amplifier 321, correction of difference of exposure conditions and of the types of the film F can be done without providing special memory for that purpose. Such correction is controlled by the CPU 201 such that such correction is not effected on a positive film, and such correction is not effected even on a negative film when the balance between the maximum and minimum values of the R, G and B is out of a prescribed range.

In the gamma correcting portion 304, data correcting process required by the difference of negative and positive film F, gamma correcting process and negative-positive inverting process are carried out. Image data VD4 output from the gamma correcting portion 304 is input to the image output portion 222 and to the memory 307.

In the image output portion 222, feedback of the color adjusting process using a color CRT and correcting process for adjusting the image data to be output with respect to the printer are carried out by the color adjusting portion 305, and electrical magnifying process in the main scanning direction and the moving process of the image data are carried out by the magnifying and moving portion 306.

The memory 307 is a combination of the input image memory 212, the VRAM 240 and the display controller 231 for transferring data therebetween shown in FIG. 7. The image data VD4 output from the image input portion 221 is stored in the input image memory 212 as it is. The image data stored in the input image memory 212 is maintained until the next new image is read by the image sensor IS. Corresponding to the content of editing process such as trimming, magnification and movement, part of or whole image data stored in the input image memory 212 is expanded or reduced to an appropriate magnification and transferred to the VRAM 240. The transferred data is read as needed, and output as image data VD7 at the display output portion 250.

In the display output portion 250, feeding back of color adjustment process utilizing a color CRT and correction process for making image data to be output accordant with the display device 12 are carried out by the color adjusting portion 308. Thereafter, a process for synthesizing image data of respective planes of the VRAM 240 is carried out by a synthesizing portion 309. Further, video signals of respective colors, that is, R, G and B are converted to analog signals by the DA converter 310 to be output to the display apparatus 12.

Figure 9:
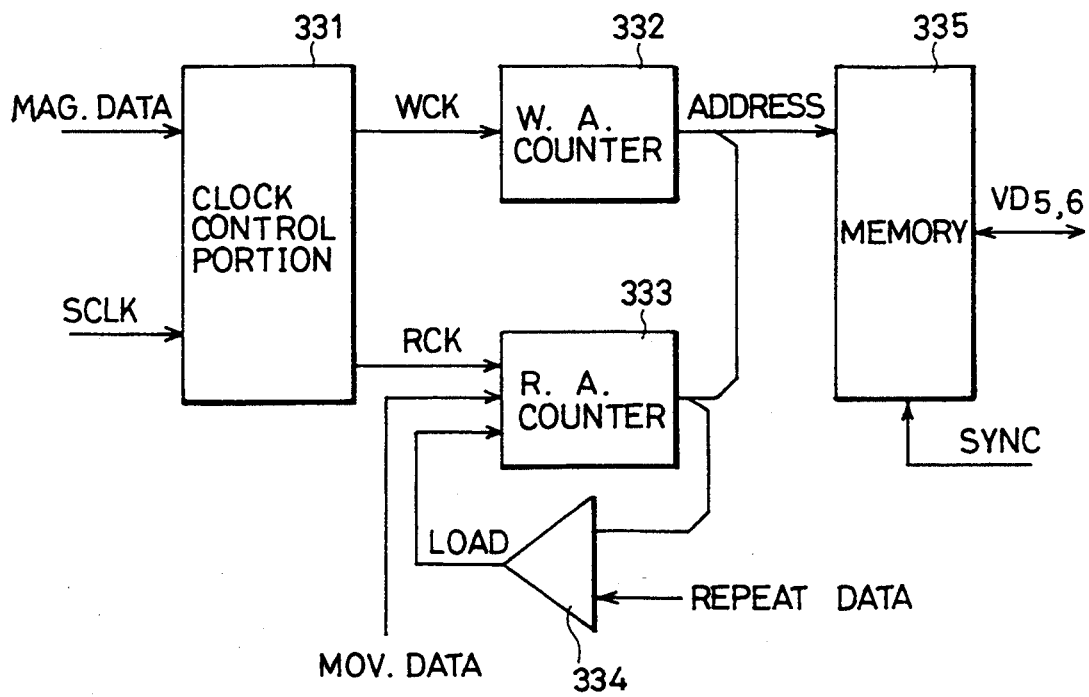
FIG. 9 shows an example of a circuitry of a magnifying and moving portion of the image processing portion shown in FIG. 8.
Figure 10:
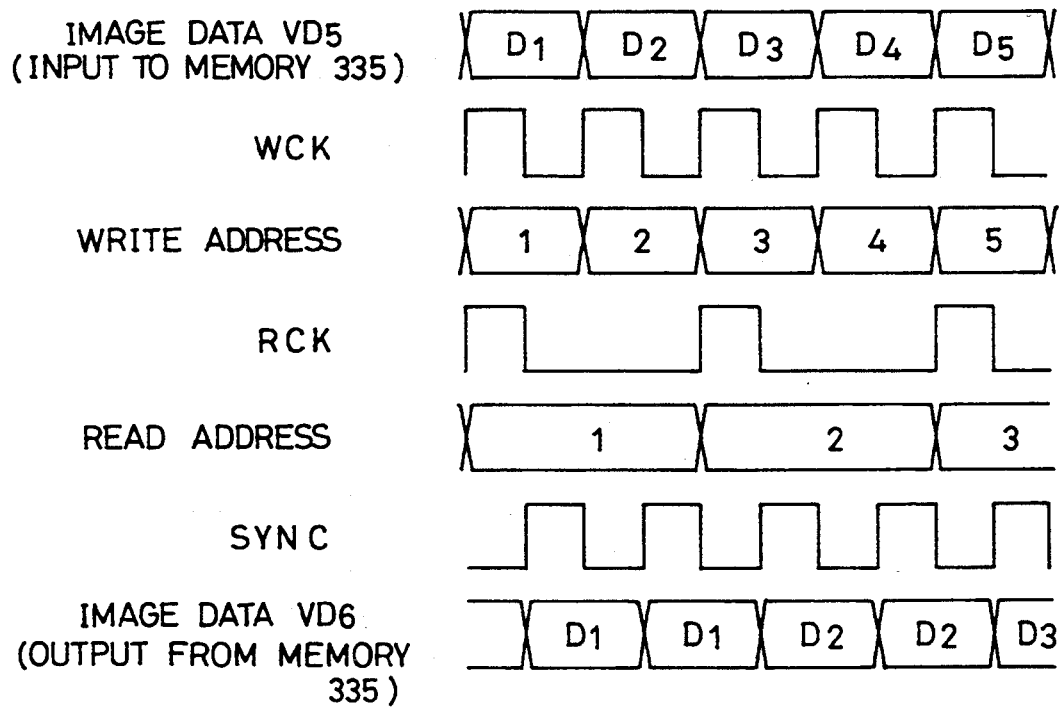
FIG. 10 is a timing chart showing the states of signals when expanding process is being carried out by the magnifying and moving portion of FIG. 8.
Figure 11:
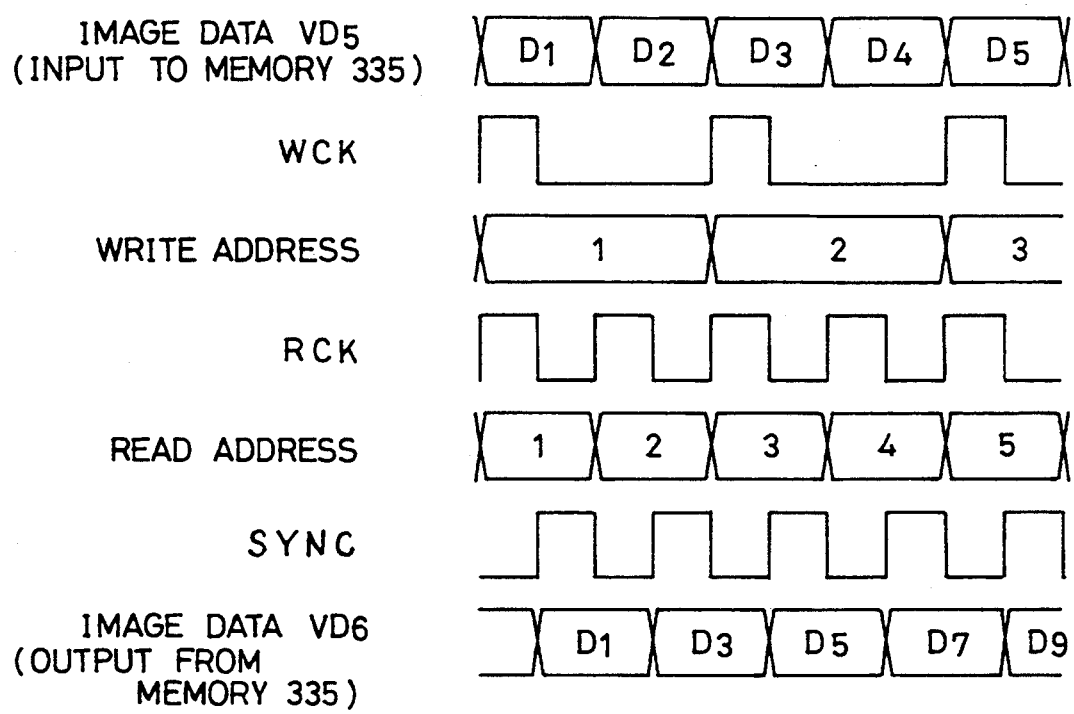
FIG. 11 is a timing chart showing states of signals when reducing process is being carried out by the magnifying and moving portion of FIG. 9.

FIG. 9 shows an example of a circuit of the magnifying and moving portion 306 of the image processing portion 300, FIG. 10 is a timing charts showing states of signals when expansion process is done by the magnifying and moving portion 306, and FIG. 11 is a timing chart showing states of signals when reduction process is done by the magnifying and moving portion 306.

The magnifying and moving portion 306 includes a memory 335 to which image data VD5 is written and from which image data VD6 is read, a write address counter 332 for generating addresses for writing to the memory 335, a read address counter 333 generating addresses for reading from the memory 335, a comparing portion 334 and a clock control portion 331. The image data VD6 is read from the memory 335 in synchronization with a pixel clock SYNC.

The clock control portion 331 generates a clock WCK for writing and a clock RCK for reading based on a reference clock SCLK and magnification data (Mag.Data) input from the CPU 201.

In writing, the write address counter 332 counts the clocks WCK for writing with "0" being an initial value, and the counted value is output as an address. In reading, the read address counter 333 counts the clocks RCK for reading with the value of the movement data (Mov.Data) as an initial value, and outputs the counted value as an address.

In expansion, the period of the read clocks RCK is made longer corresponding to the magnification rate (magnification rate of expansion) as shown in FIG. 10, the change of the address value in reading becomes slower, the same data is read plural times by the pixel clock SYNC from the memory 335, and thus expansion is done. In the example of FIG. 10, the image data is expanded twice.

In reduction, the period of the clocks WCK for writing is made longer corresponding to the magnification rate (magnification rate for reduction) as shown in FIG. 11, the change of the address value in writing is made slower, and the image data are skipped to be written to the memory 335. Since the skipped image data are read by the pixel clock SYNC, reduction is done. In the example of FIG. 11, the image data is reduced to one half.

The read address output from the read address counter 333 starts from the value of the movement data input thereto, and therefore the image moves in the right and left directions in accordance with the value of the movement data. If the read address counter 333 carries out subtracting operation by the clock RCK, a mirror image of the original is provided.

When repeat data (Repeat Data) is input, a re-count signal (Load) is output when the counted value reaches the value of the repeat data, the movement data is set as the initial value of the read address counter 333, and counting is started again from that value. Therefore, the addresses from the value of the movement data to the value of the repeat data are output repeatedly, and the data stored in these addresses are read repeatedly from the memory 335. This operation is done for providing reduced continuous copies.

As to the basic operation of the film scanner 1 structured as described above, when a film image is to be simply printed out, a film F is loaded and a print key 74 is turned on. Thus the film image is read, and image information corresponding to the film image is output to an external printer. In this case, the read image is not displayed.

When output image is to be monitored prior to the printing out, or when image edition such as trimming, expansion, reduction or color adjustment is to be carried out, the image input key 73 is turned on after the film F is loaded. Thus the film image is read and the read image is displayed on the screen HG of the display apparatus 12. Operation such as setting of image edition is carried out while monitoring the displayed image and then the print key 74 is turned on. Then the film image is again read, set process of edition is effected on the read image data, and resulting image is printed out. In the film scanner of the present embodiment, when a cursor CU is in the image displaying area E1, the same effect as when the trimming button Z2 is input is generated and the trimming mode is set. Namely, only by moving the cursor CU in the image displaying area E1, the trimming mode is automatically set to allow designation of the trimming area, and when the cursor CU is moved outside the image displaying area E1 (that is, in the displaying area E2 for operation), the trimming mode is released, allowing selection of the buttons Z.

The cursor CU is displayed to have a shape for trimming mode, such as a cross in the image displaying area E1, and when it is in the display area E2 for operation, it is displayed to have a shape of an arrow, for example, for mode selection. Therefore, the operator can easily recognize whether it is the trimming mode or not.

The operation procedure of the trimming mode will be described.

When an operator wants to trim the film image, the film image is displayed on the image displaying area E1 of the screen HG, as described above, and the operator designates a trimming area by designating two points by means of the track ball 71 and the enter key 72.

Figure 12A:
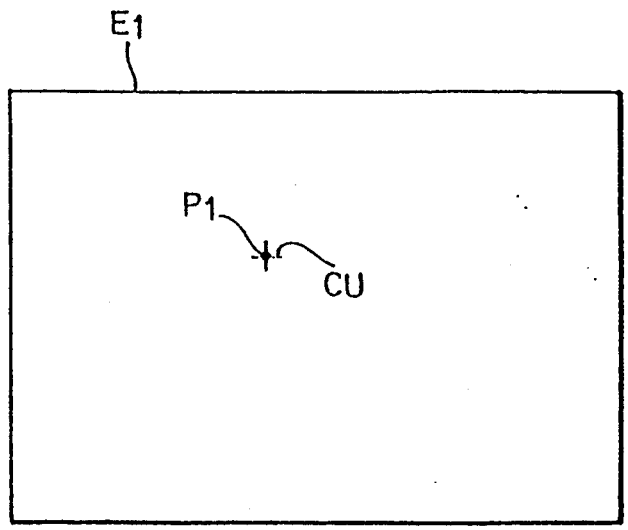
FIG. 12 shows prescribed processes of setting the trimming frame in accordance with one embodiment of the present invention.

More specifically, as shown in FIG. 12(a), the cursor CU is moved to a point P1 which is one vertex of the trimming area and the enter key 72 is turned on. Thereafter, when the cursor CU is moved, a rectangular trimming frame TF with the point P1 and the point of the cursor being the opposite points on the diagonal is displayed. The trimming frame TF is transformed as the cursor CU is moved.

When the trimming frame TF is matched with the area to be trimmed, the enter key 72 is turned on. Thus the area surrounded by the trimming frame TF has been designated as the trimming area.

Thereafter, when the position of the trimming area is to be changed, the enter key 72 is turned on with the cursor CU being displayed in the trimming frame TF. This enables movement of the trimming frame TF and by operating the track ball 71 in this state, the trimming frame TF is moved related to the cursor CU with the shape kept as it is. The operator appropriately moves the trimming frame TF and locates the trimming area at a desired position.

When the trimming area is determined, the output confirmation button Z5 is input to set the output confirmation mode, so as to confirm the trimmed image (trimming image). Thus data corresponding to the trimming area out of the image data stored in the input image memory 212 are transferred to the VRAM 240 and displayed on the screen HG.

At this time, if a normal copy image is to be displayed, the output sheet designated is displayed in white in the image displaying area E1 of the screen HG, with the trimmed image positioned at the center of the sheet. If the sheet has a standard size, the trimmed image is displayed automatically magnified so that it has maximum size in the sheet. Therefore, if the size of the trimming area is changed, the magnification rate (variable magnification rate) M is automatically changed. If the size of the sheet is changed, the magnification rate M and the size of the trimmed image are automatically changed in response. When the output size of the trimmed image or the magnification rate M is designated, the display is given in the corresponding size.

In the film scanner 1 of the present embodiment, the film image read by the image sensor IS has pixels of 4096 dots in the lengthwise direction (main scanning direction) and 6144 dots in the widthwise direction (subscanning direction) regardless of the type of the film. The aspect ratio thereof is 1:1.5. Meanwhile, the aspect ratio of a standard size sheet is 1:1.41. Therefore, only that portion of the film image which corresponds to 5792 dots at the central portion in the widthwise direction is printed, and portions on both sides each corresponding to 172 dots in the widthwise direction are deleted. The magnification rate M at printing out is at the equal scale when one pixel on the film image is printed out corresponding to one dot of the printer, without effecting electrical magnification on the pixels of the read film image. Therefore, when the film image is printed out in equal scale by using a printer of 400 dpi, the image will be about $25 \times 36$ cm$^2$ regardless of the type of the film (size of the film). The magnification rate of the optical system is varied dependent on the type of the film.

Meanwhile, the magnification rate for display (Mdisp) on the screen HG is represented by the ratio (dot/mm) of the number of pixels (dots) on the screen HG with respect to the size (mm) on the sheet.

In the trimming mode, when the read film image is displayed on the screen HG, the trimming frame initially set by the trimming frame default setting process, which will be described later, is simultaneously displayed.

The trimming frame which is initially set shows the trimming area having the aspect ratio RS which is the same as the aspect ratio RS of the area in which printing is possible of the designated output sheet in terms of default values (initial values). The trimming area in accordance with the default value can have its size changed while the aspect ratio RS is kept constant.

This is to prevent generation of a blank portion in which images are not formed in the area in which printing is possible by effecting trimming to completely fill the area allowing printing, since the aspect ratio RS of the film image is different from that of the area allowing printing on the output sheet (having the standard size).

Figure 13:
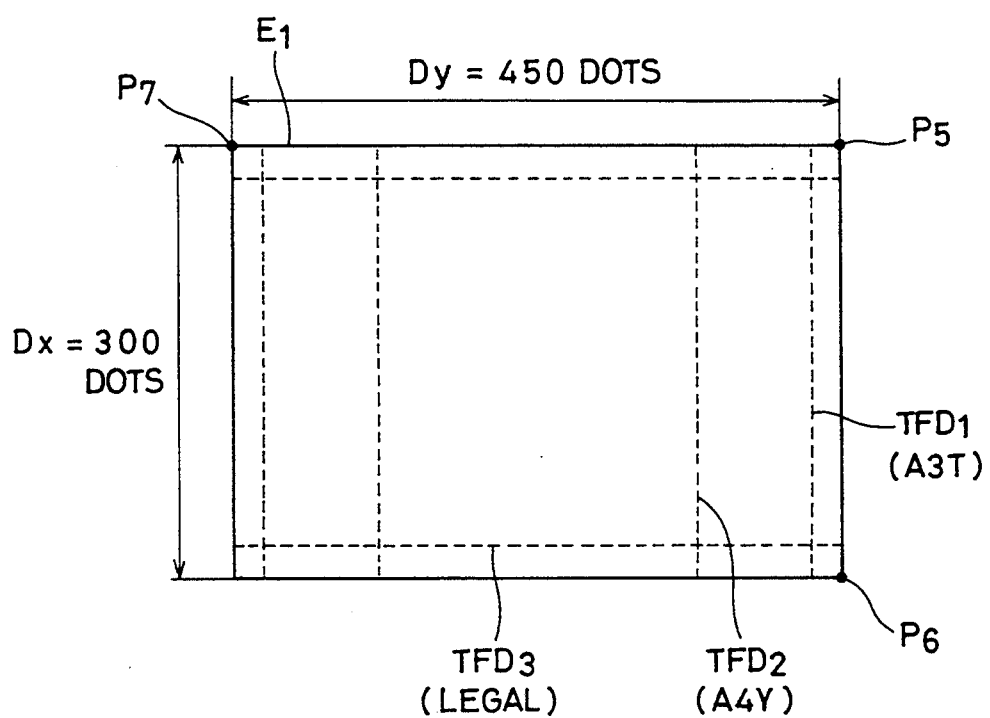
FIG. 13 shows a state of setting the trimming frame based on the default values for various output sheets in accordance with one embodiment of the present invention.
Figure 14:
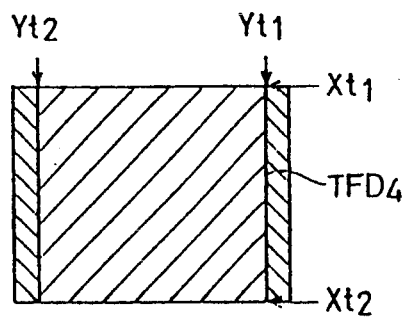
FIG. 14 shows a state of setting the trimming frame based on the default values for various films and various output sheets in accordance with one embodiment of the present invention.
Figure 14:
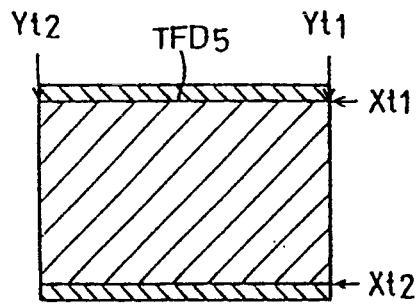
Figure 14:
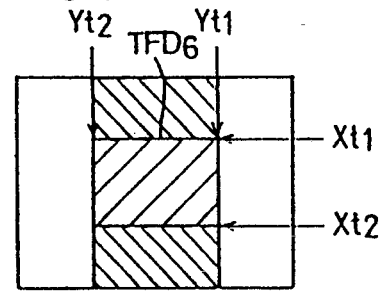
Figure 14:
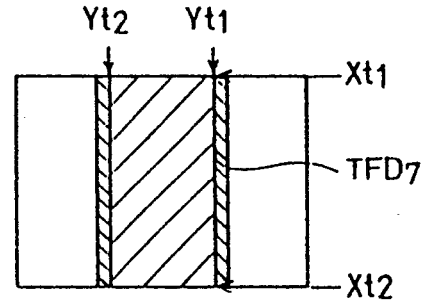
Figure 14:
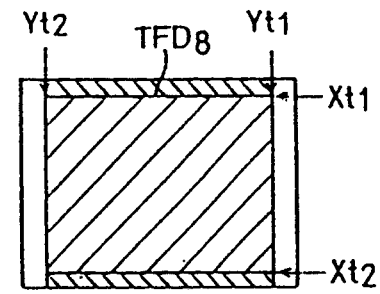
Figure 14:
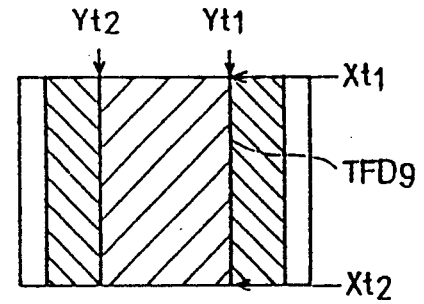

FIG. 13 shows states of setting trimming frames TFD in accordance with the default values with respect to various output sheets, and FIG. 14 shows states of setting trimming frames TFD 4 to 9 in accordance with the default values with respect to various films and output sheets.

As shown in FIG. 13, when the image of a film F3 having the 35 mm size is displayed and A3T is designated at the output sheet (where "T" corresponds to an arrangement in which the longer side corresponds to the subscanning direction), a corresponding trimming frame TFD1 corresponding to the output sheet but slightly shorter in the subscanning direction (widthwise direction of the screen) than the image displaying area E1 is displayed. When A4Y (where "Y" shows an arrangement in which shorter side corresponds to the subscanning direction) or legal size is designated, trimming frames TFD2 and 3 corresponding to respective output sheets are displayed.

As shown in FIGS. 14(a) and (b), when the image of a film F3 having the 35 mm size is displayed and an output sheet having the aspect ratio RS larger than 0.666 is designated, the trimming frame TFD 4 in accordance with the default value is reduced in the subscanning direction, and if an output sheet having the aspect ratio RS smaller than 0.666 is designated, the trimming frame TFD 5 of the default value is reduced in the main scanning direction (lengthwise direction of the screen). As shown in FIGS. 14(c) to (f), when films F2 and F1 respectively having 6 cm size or $4 \times 5$ inch size are shown, trimming frames TFD 6 to 9 in accordance with the default values reduced in the main scanning direction or in the subscanning direction are displayed with the aspect ratio RS of 1.33 or 0.8 being the boundary.

Figure 15:
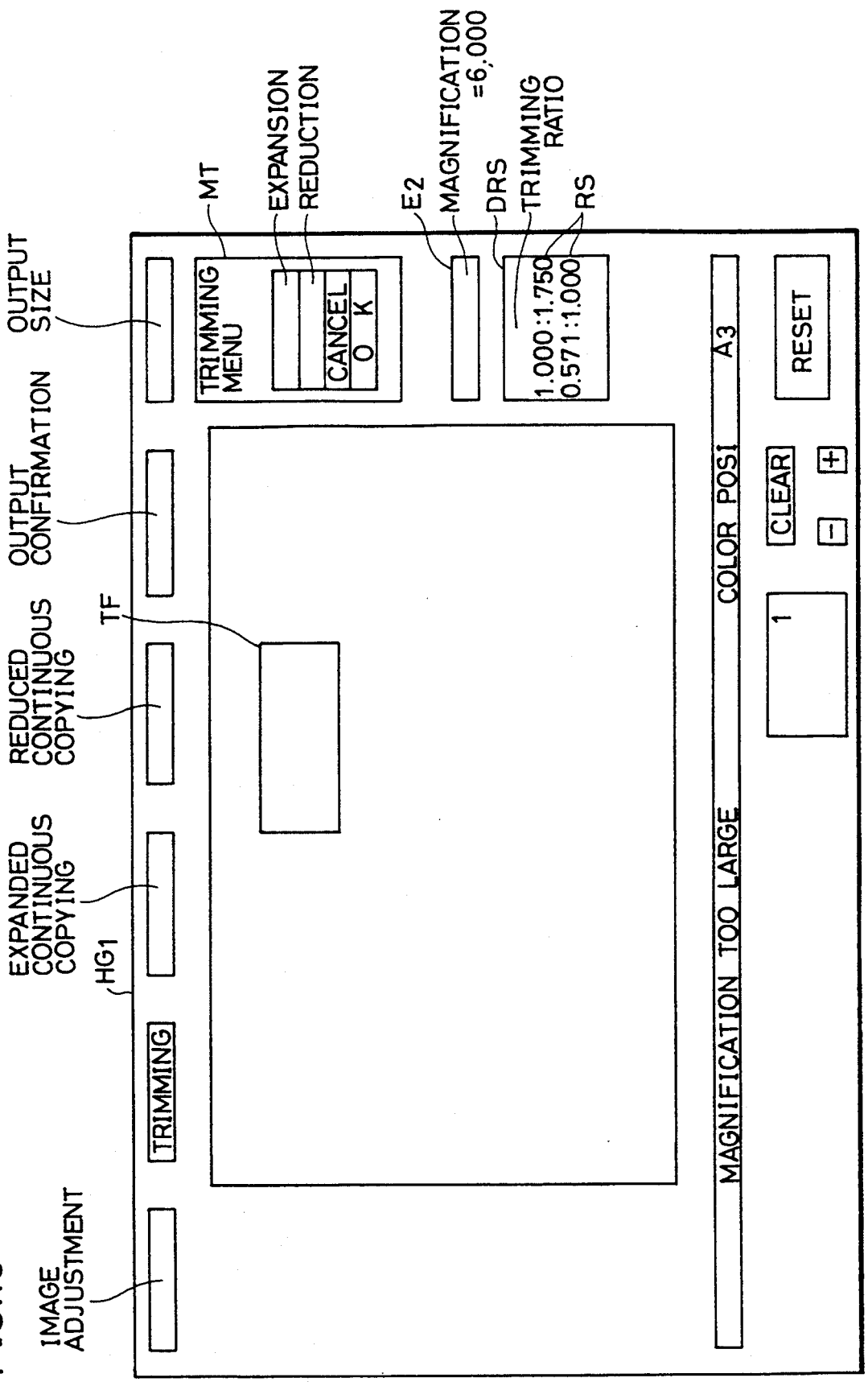
FIG. 15 shows another example of the display on the screen of the film scanner shown in FIG. 1.
Figure 16:
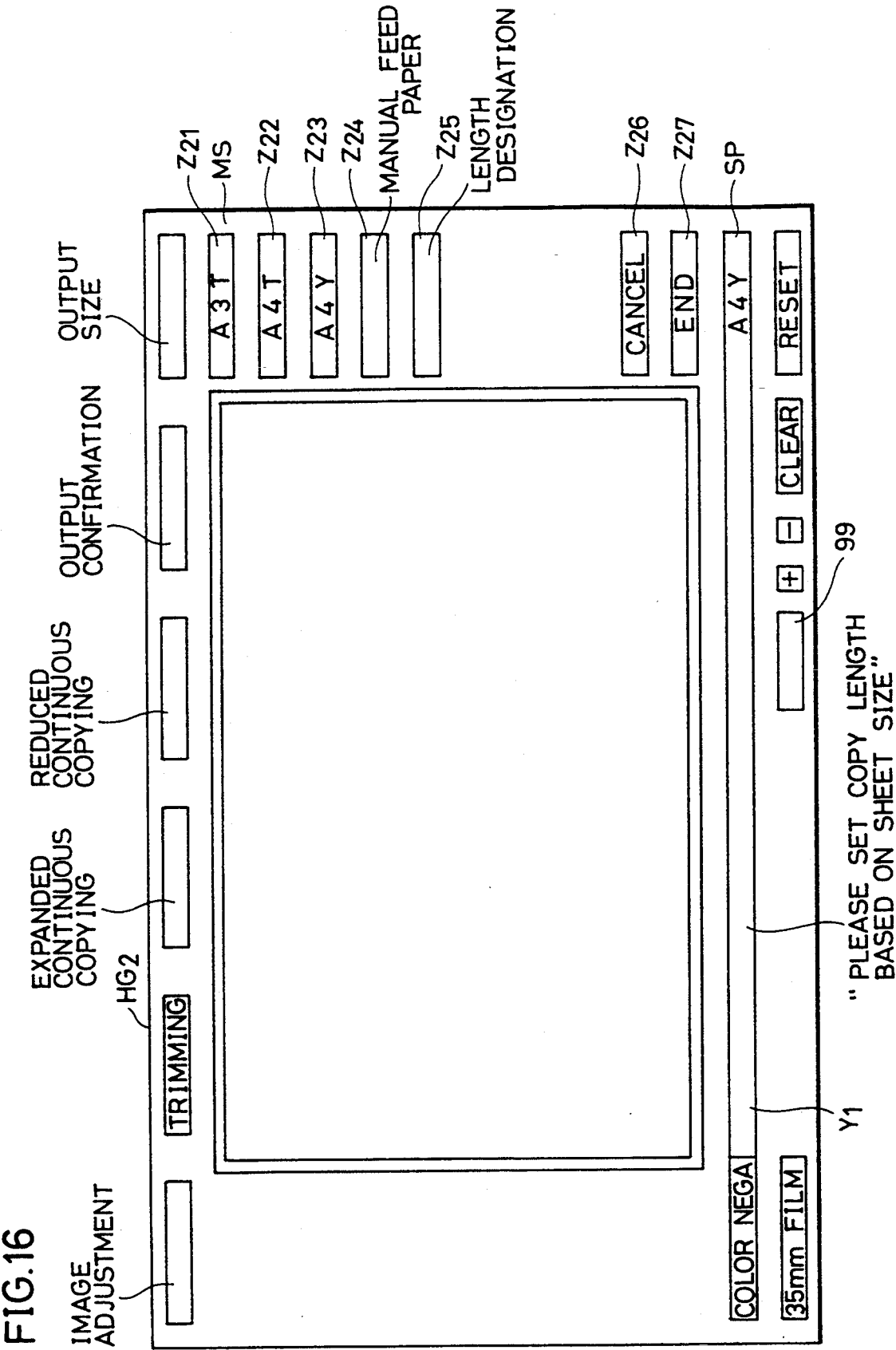
FIG. 16 shows a further example of the display on the screen of the film scanner shown in FIG. 1.

FIGS. 15 and 16 show examples of display on the display screen HG 1 and 2.

On the screen HG 1 of FIG. 15, the value of the aspect ratio (trimming ratio) RS of the displayed trimming frame TF is displayed on the display area E2 for operation as the display of aspect ratio DRS. In this display of aspect ratio DRS, two aspect ratios RS that is one based on the lengthwise direction (main scanning direction) and one based on the widthwise direction (subscanning direction) are displayed.

On the screen HG 2 of FIG. 16, an output size submenu MS is displayed and the output sheet size SP designated therefrom is displayed at a message displaying portion Y1. Details will be described later.

FIG. 17 shows areas permitting printing (valid size) and aspect ratios RS of various output sheets, FIG. 18 shows pixel addresses on the film and the coordinates of the trimming frames TFD of the default values on the screen HG in accordance with combinations of film size and aspect ratio RS of various output sheets and FIG. 19 shows aspect ratios RS and display regions (display areas) of various films F.

In FIG. 17, the length of the area in which printing is possible=length of the sheet size $-11$, width of the area in which printing is possible=width of the sheet size —6, aspect ratio RS=length/width of the area in which printing is possible.

In FIG. 18, Xt1, Xt2, Yt1 and Yt2 denote trimming areas (trimming frame TFD) in accordance with the default values on the screen HGf while FXt1, FXt2, FYt1 and FYt2 denote trimming areas in accordance with the default values on the film image. The table TB2 shown in FIG. 18 is stored in a ROM 202.

In FIG. 19,
image dimension ratio=dimension of film image in the main scanning direction/dimension of the film image in the subscanning direction,
Yt1=(450−300/image dimension ratio)/2+1
Yt2=(450+300/image dimension ratio)/2
FYt1=(6144−4096/image dimension ratio)/2+1 and
FYt2=(6144+4096/image dimension ratio)/2.

Figure 20:
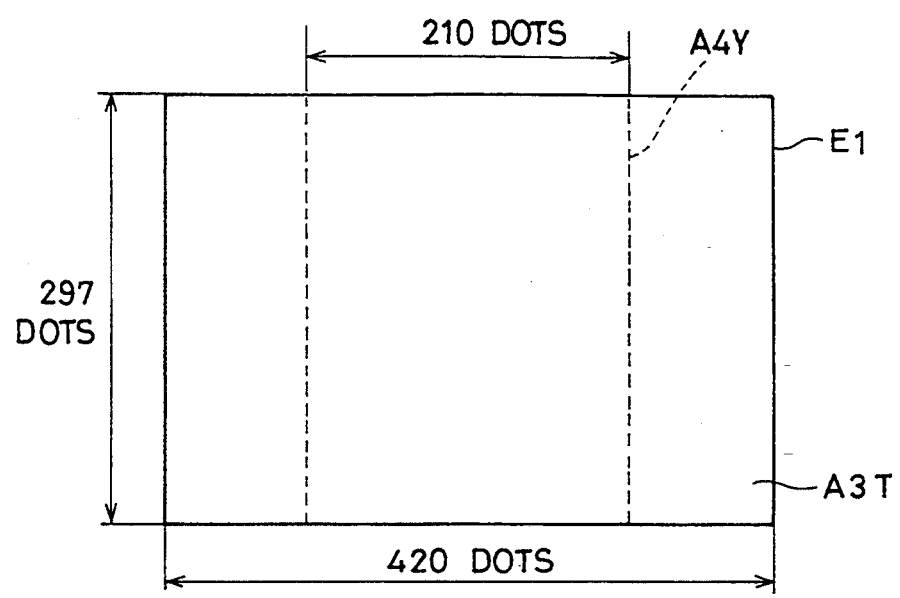
FIG. 20 shows pixel structure of an image display area on the screen in accordance with one embodiment of the present invention.

Referring to FIG. 20, magnification for display Mdisp is determined based on the idea that the pixels on the image displaying area E1 of the screen HG includes 297 dots in lengthwise direction and 420 dots in the widthwise direction, and 1 dot of pixel on the screen HG corresponds to 1 mm on the sheet. If the magnification for display Mdisp is equal scale magnification, a sheet having the length of 297 mm and width of 420 mm is displayed on the image displaying area E1 which means that a standard size sheet of A3T (where T indicates that the sheet is arranged in the lengthwise direction, that is, the longer side of the sheet coincides with the subscanning direction, and in that case the lengthwise direction of the sheet coincides with the widthwise direction of the screen HG) is displayed fully on the image displaying area E1.

Therefore, if the output sheet size is A3T, that is, when the magnification for display Mdisp is equal scale magnification, the film image read by 4096×6144 dots is displayed on the screen HG by 297×420 dots, and therefore when the image data is transferred from the input image memory 212 to the VRAM 240, the image data is reduced to 297/4096.

If the sheet is set in the lengthwise direction and the size thereof is other than A3T, the magnification for display Mdisp=(A3T sheet size/selected sheet size). For example, when a sheet of A1T is to be displayed on the image displaying area E1, then the magnification for display Mdisp is "½".

When the output sheet is arranged widthwise, a standard sheet of A4Y (Y means arrangement in widthwise direction) is used as a reference. Therefore, when the magnification for display Mdisp is the equal scale magnification, a standard sheet of A4Y having the length of 297 mm and width of 210 mm is displayed on the central 297 dots in the lateral direction and 210 dots in the widthwise direction of the image displaying area E1. As for sheets arranged in the widthwise direction other than A4Y, the magnification for display Mdisp=(A4Y sheet size/selected sheet size).

The size and position of the film image and the trimming frame displayed on the screen HG will be more specifically described with reference to the figures.

Figure 21:
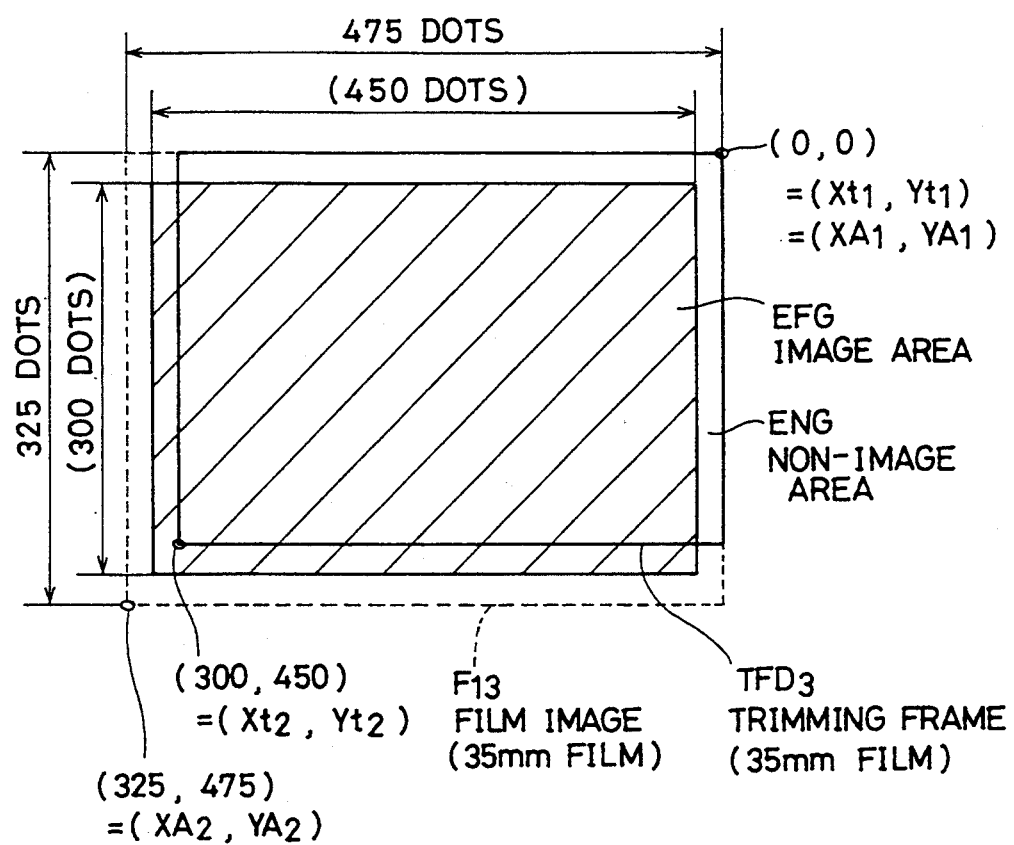
FIG. 21 shows the state of display of a film image of a 35 mm film on the screen, in accordance with one embodiment of the present invention.

FIG. 21 shows a state of display of a film image FI3 of a 35 mm film F3 on the screen HG.

The film image FI3 is displayed by 325 dots in the lengthwise direction and 475 dots in the widthwise direction in the image displaying area E1 on the screen HG. Since an area larger by 1 mm in upper, lower, left and right directions, respectively than the image area EFG of the film F3 is read as described above as the film image FI3, the image area EFG (hatched portion in FIG. 21) is, though dependent on the state of setting of the film F3, located approximately at the central portion of the film image FI3, and the peripheral portion thereof is a non-image area ENG.

The trimming frame TFD 3 in accordance with the default value has the same size as the image area EFG and displayed with the upper right corner aligned with the film image FI3.

In this state of display, the trimming frame TFD3 is moved to the image area EFG and by effecting trimming process thereafter, a film image IF3 which is consisted of the complete image area EFG not including the non-image area ENG can be obtained.

Figure 22:
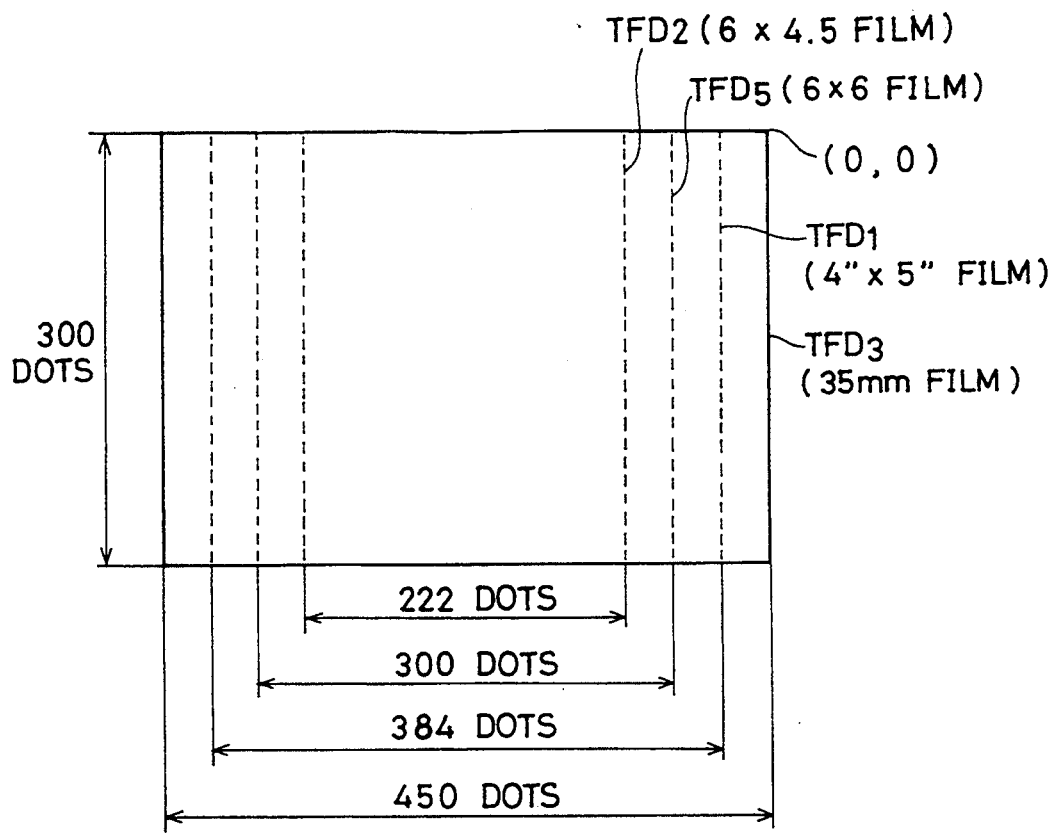
FIG. 22 shows states of display of trimming frames based on default values for various film images in accordance with one embodiment of the present invention.

FIG. 22 shows states of display of the trimming frames TFD in accordance with default values for various film images FI.

As shown in FIG. 22, the trimming frames TFD for films F other than the 35 mm film are positioned near to the central portion corresponding to the display positions of the film images FI, respectively.

Figure 23:
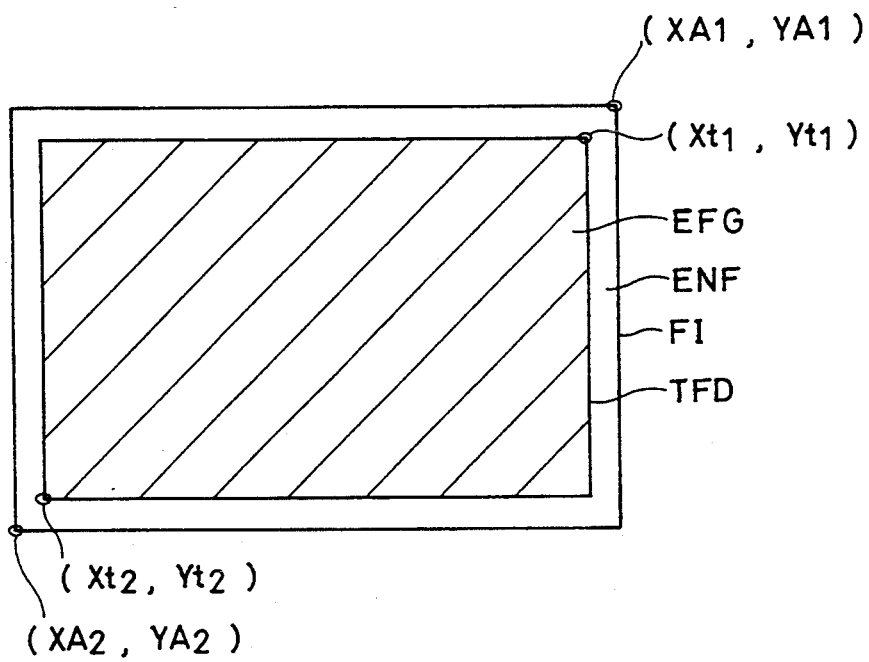
FIG. 23 shows another example of the arrangement for setting the trimming frame based on the default values in accordance with one embodiment of the present invention.

In the above described embodiment, when the trimming frame TFD in accordance with the default value is displayed with the upper right corner of the trimming frame TFD registered with the upper right corner of the film image FI, in the example of FIG. 23, the trimming frame TFD is displayed as set to be arranged at the central portion of the film image IF.

FIG. 23 shows another embodiment of the arrangement when the trimming frame TFD in accordance with the default value is set.

Referring to FIG. 23, the trimming frame TFD is arranged at the center of the film image FI, therefore the trimming frame TFD comes nearer to the image area EFG, and therefore the amount of movement of the trimming frame TFD for making the trimming frame TFD matched with the image area EFG is reduced. When the film F is successively set at the center, the trimming frame TFD coincides with the image area EFG and movement of the trimming frame TFD becomes unnecessary, which further facilitates the operation.

The coordinates of the opposing points on the diagonal of the trimming frame TFD in this example are calculated in accordance with the following equations (7) to (10).

$$Xt1=(XA-300)/2 \qquad (7)$$

$$Xt2=300+(XA-300)/2 \qquad (8)$$

$$Yt1=(450-300 \times \text{image dimension ratio})/2+(YA-300 \times \text{image dimension ratio})/2 \qquad (9)$$

$$Yt2=(450+300 \times \text{image dimension ratio})/2+(YA-300 \times \text{image dimension ratio})/2 \qquad (10)$$

An example of the process at the control portion 200 when trimming is carried out will be described.

Figure 24:
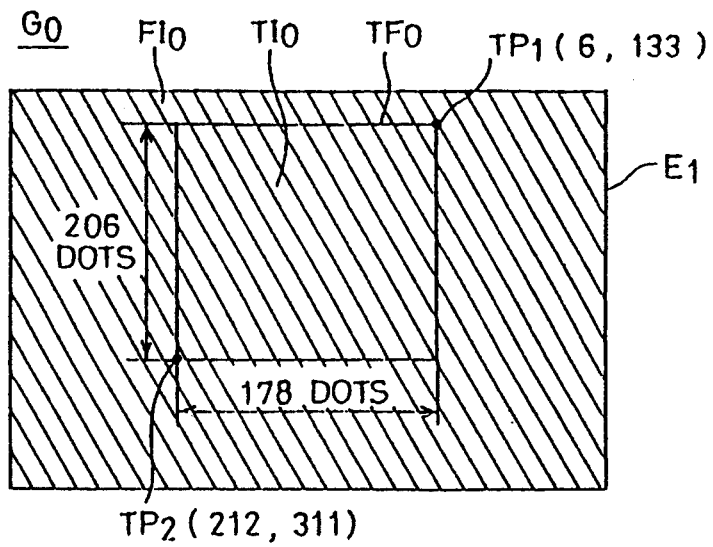
FIG. 24 shows a display for trimming edition and a display for confirmation in accordance with one embodiment of the present invention.
Figure 24:
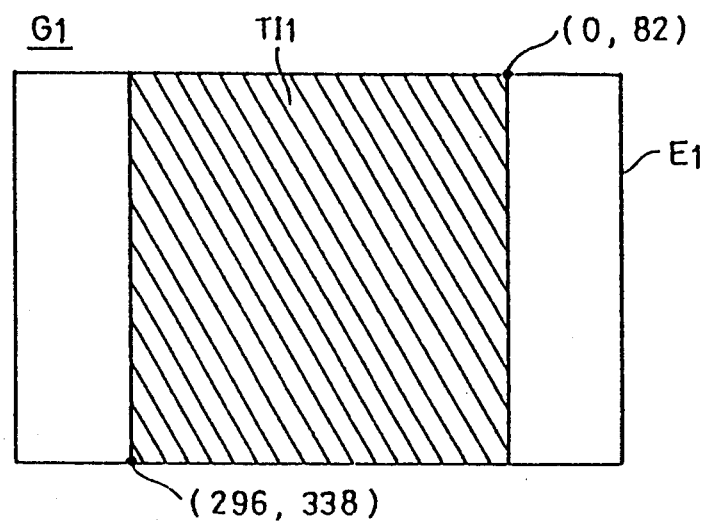
Figure 24:
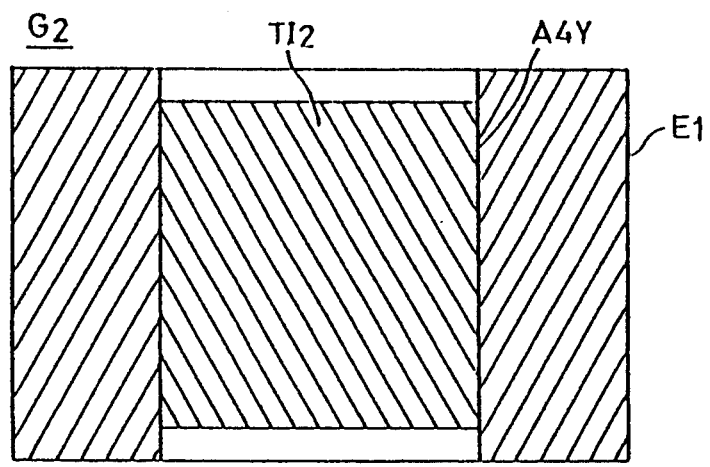

FIG. 24 shows a display G0 for trimming edition and displays G1 and G2 for confirmation.

As for the coordinate in the image displaying area E1 on the screen HG, the upper right end of the image displaying area E1 is regarded as the origin (0, 0), and incremented by "1" per 1 dot toward the lower direction (main scanning direction) and the left direction (subscanning direction). Namely, the coordinate at the lower left end of the image displaying area E1 is (296, 419).

As shown by the display GO for trimming edition of FIG. 24(a), in the film image FI having the size of A3T displayed fully in the image displaying area E1, the trimming frame TF is determined by designating two points, that is, TP1 (6, 133) and TP2 (212, 311) so as to determine the trimmed image TI. The number of dots on the screen HG of the trimmed image TI is 206×178 dots. A standard size sheet of A3T is designated as the output sheet.

When output confirmation button Z5 is input to set the output confirmation mode, a display G1 for confirmation such as shown in FIG. 24(b) is given. In the display G1 for confirmation, the trimmed image TI0 is enlarged by 1.44 (=297/206) both in the lengthwise and widthwise directions, and displayed full in the lengthwise direction of the image displaying area E1 as the trimmed image TI1, and portions on both sides of the trimming area TI1 in the image displaying area E1 are displayed as white sheets.

The state displayed as the display G1 for confirmation represents with fidelity the actual relation between the image and the sheet when the image is printed out by depressing the print key 74. Therefore, whether or not the hard copy image desired by the operator can be surely obtained can be confirmed easily, preventing erroneous printing.

When the size of the trimming image TI1 to be printed out is directly designated, the trimmed image TI1 of the designated size is displayed at the center of the image displaying area E1 of the display G1 for confirmation, and printing of the displayed state is carried out.

When the size or position of the trimmed image TI1 is to be changed with the display G1 for confirmation kept displayed, re-trimming process mode is set by turning on the enter key 72, the original image shown in FIG. 24(a) is displayed on the screen HG, and the trimming frame TF0 can be moved or changed on the screen HG. Thereafter, the display for confirmation G1 is displayed by setting the output confirmation mode again. By repeating such operation, trimming desired by the operator can be easily done without error.

As shown in FIG. 24(a), the two points TP1 (6, 133) and TP2 (212, 311) initially designated on the screen HG correspond to the points [83(=6×4096/297), 2006(=172+133×4096/297)] and the point [2924(=212×4096/297), 4461(=172+311×4096/297)] on the film image FI0 at the time point of reading from the film, taking into account that 172 dots are deleted in the widthwise direction at both end portions. 1 dot on the screen HG corresponds to about 16 dots in a printer of 400 dpi (about 16 dots/mm). Therefore, the two points (0, 82) and (296, 338) of the trimmed image TI1 on the display GI for confirmation shown in FIG. 24(b) correspond to the points (0, 1312) and (4752, 5408) when represented by the dots on a sheet of A3T.

Therefore, in order to print out such trimmed image TI1 on a sheet of A3T, the magnifying and moving portion 306 of the image output portion 222 carries out the following process. Namely, "white" data is continuously output for the first 1311 lines (1 line means one line of pixels in the lengthwise direction of the film image), data of 83 to 2924 dots of the 2006th line of the image data VD5 of the read film image are output by electrically magnifying the same in the lengthwise direction (main scanning direction) by 1.67[=4752/(2924−83)], the data of 1313 to 5408th lines are output by electrically magnifying the same in the lengthwise direction and widthwise direction (subscanning direction) by 1.67, and "white" data is output at the 5409th and the following lines.

When the trimming image TI0 is determined as shown in FIG. 24(a) and a standard size sheet of A4Y is designated as the output sheet, the enlarged trimmed image TI2 is displayed at the central portion of the area of the A4Y sheet of the image displaying area E1, as shown in FIG. 24(c).

In the film scanner 1 of the present embodiment, it is possible to freely move the trimmed image TI0 in the range of the output sheet to be laid out and printed out at a desired position on the sheet, and the state of layout can be displayed on the screen HG.

Figure 25:
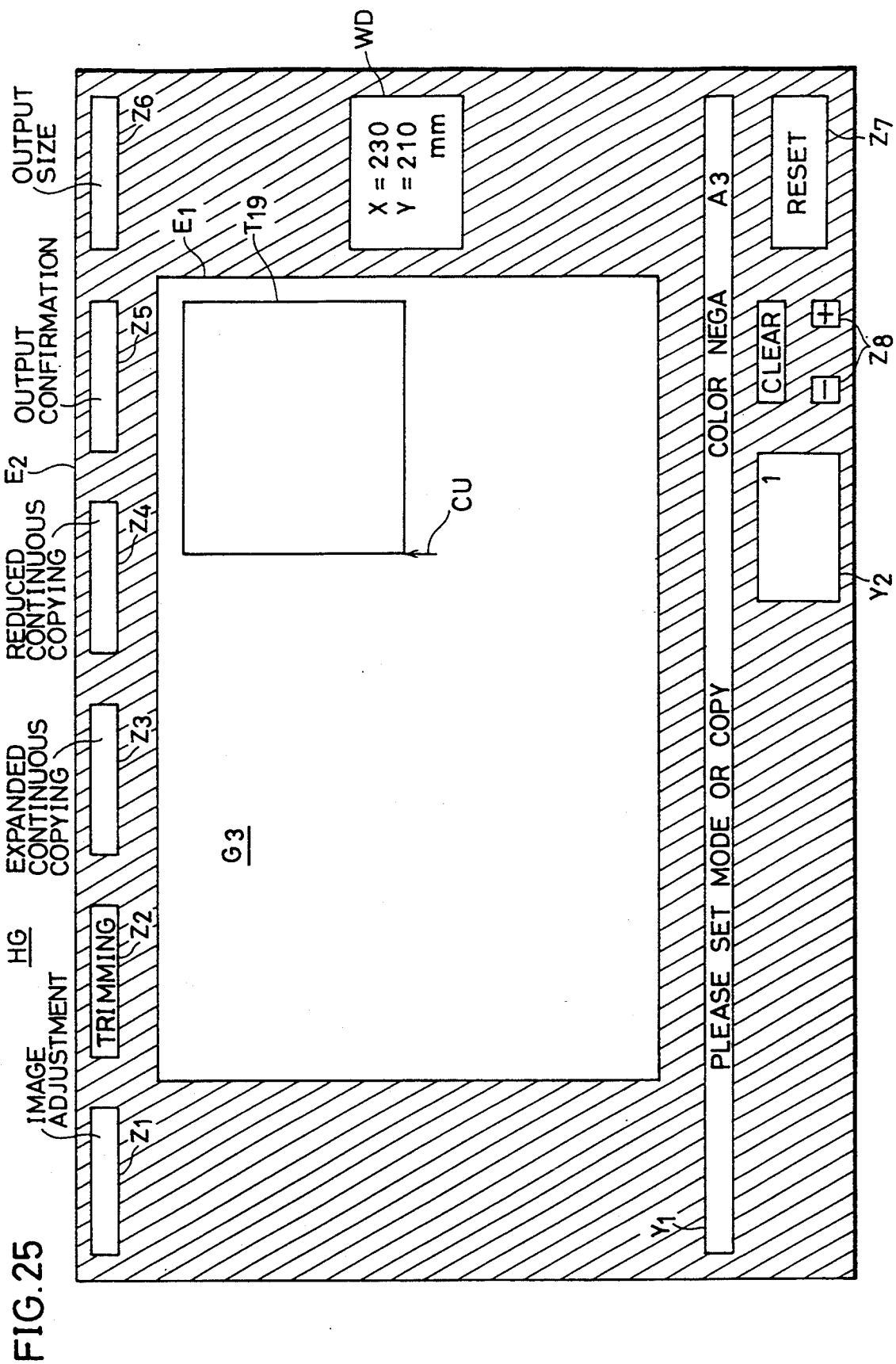
FIG. 25 shows another example of the display for confirmation in accordance with one embodiment of the present invention.

When the trimming image TI0 is determined as shown in FIG. 24(a), for example, and if the trimmed image TI0 is to be arranged at the upper right side of the output sheet, then the output size of the trimming image TI0 is designated, the trimming frame TF0 is moved to the desired position by moving the cursor CU, and by turning on the enter key 72, the trimmed image TI3 is displayed at that position, as shown in the display G3 for confirmation shown in FIG. 25. In the display G3 for confirmation, the image displaying area E1 is the same as the standard size sheet of A3T, and the trimmed image TI3 is displayed at the upper right side thereof.

On the display G3 for confirmation, the position of the cursor CU when the enter key 72 is turned on is displayed as a window WD at a blank portion on the right of the display area E2 for operation. At this time, the position of the cursor CU is displayed by numerals showing the equivalent coordinate on the output sheet, in the window WD.

Therefore, the position of the trimming image TI3 can be accurately known not simply by one's sense but by the numerals, and therefore the position of the trimmed image TI3 can be precisely adjusted, surely preventing generation of miscopies. In displaying the moved image or the position of the cursor CU, correction is made taking into consideration the magnification for display Mdisp.

The control operation by the CPU 201 will be described with reference to the flow chart.

Figure 26:
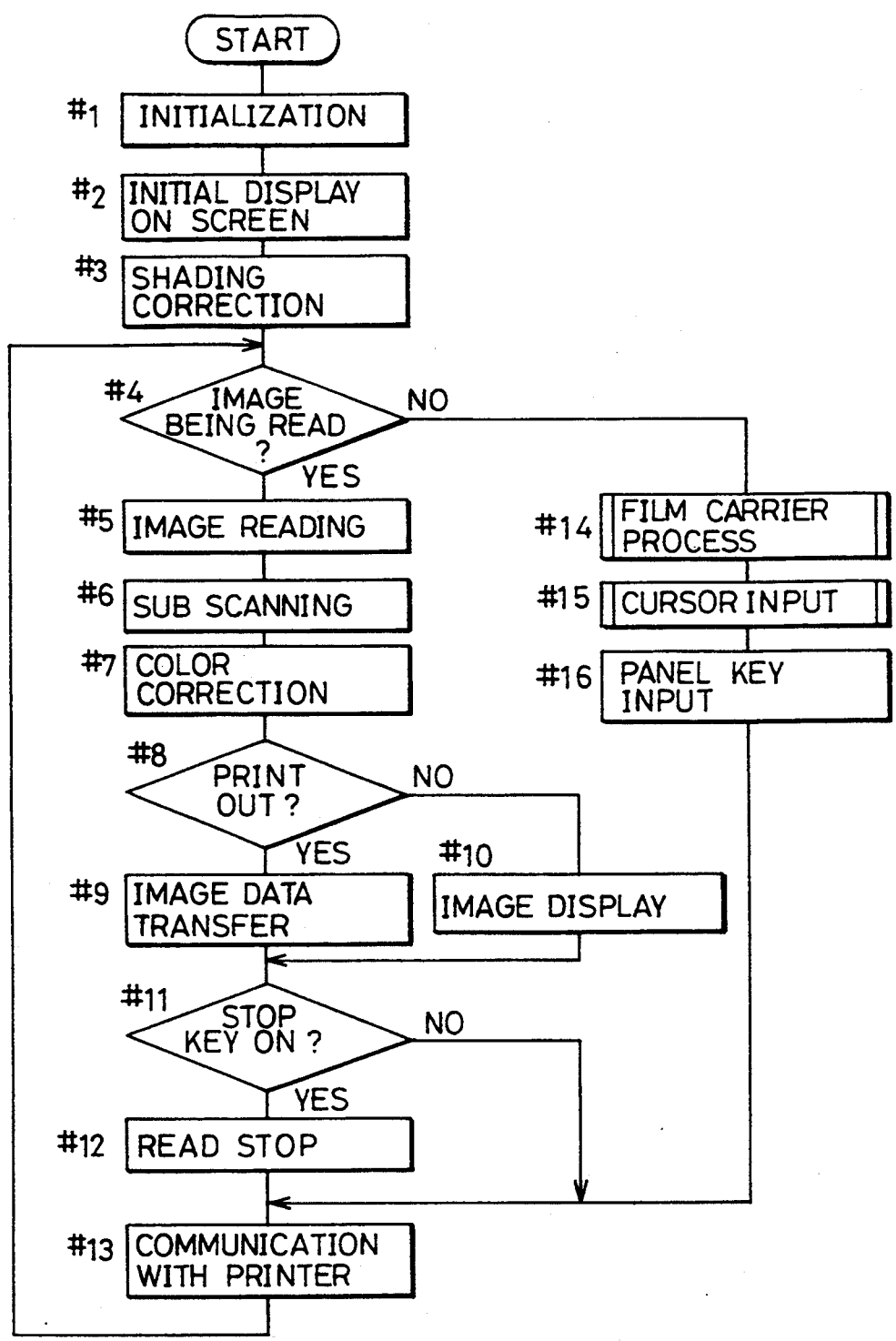
FIG. 26 is a main flow chart showing schematically the operation of the CPU 201 in accordance with one embodiment of the present invention.

FIG. 26 is a main flow chart showing schematically the operation of the CPU 201.

When the power is turned on and the program starts, initialization for initializing states of memories and the like is carried out (step #1), initial display is given on the screen HG of the display apparatus 12 (step #2), and the process for shading correction at the image input portion 221 is carried out (step #3).

Thereafter, whether or not the film image is being read is checked (step #4), and if it is being read, image reading process in which signal processing is controlled by the image input portion 221 (step #5), subscanning process for reading film image by the image sensor IS by scanning (step #6) and color correction process (step #7) are successively carried out.

Thereafter, it is determined whether or not the reading at that time is for printing out (step #8). In other words, whether or not the reading is in response to turning on of the print key 74 is determined.

If it is YES in #8, image data transfer process for outputting image information to the printer is executed (step #9). If it is NO in step #8, image display process for displaying the read image is carried out (step #10).

Thereafter, whether or not the stop key 75 is ON is determined (step #11). It the stop key 75 is ON, read stop process is carried out (step #12). Thereafter, communication with the printer is effected (step #13) and the flow returns to the step #4.

If it is NO in step #4, film carrier process for determining whether or not the film F is loaded and for defecting the type of film (step #14), cursor input process related to position designation by the cursor CU (step #15) and panel key input process receiving key operations on the operation panel OP (step #16) are successively carried out, and then the flow proceeds to the aforementioned step #13.

Figure 27:
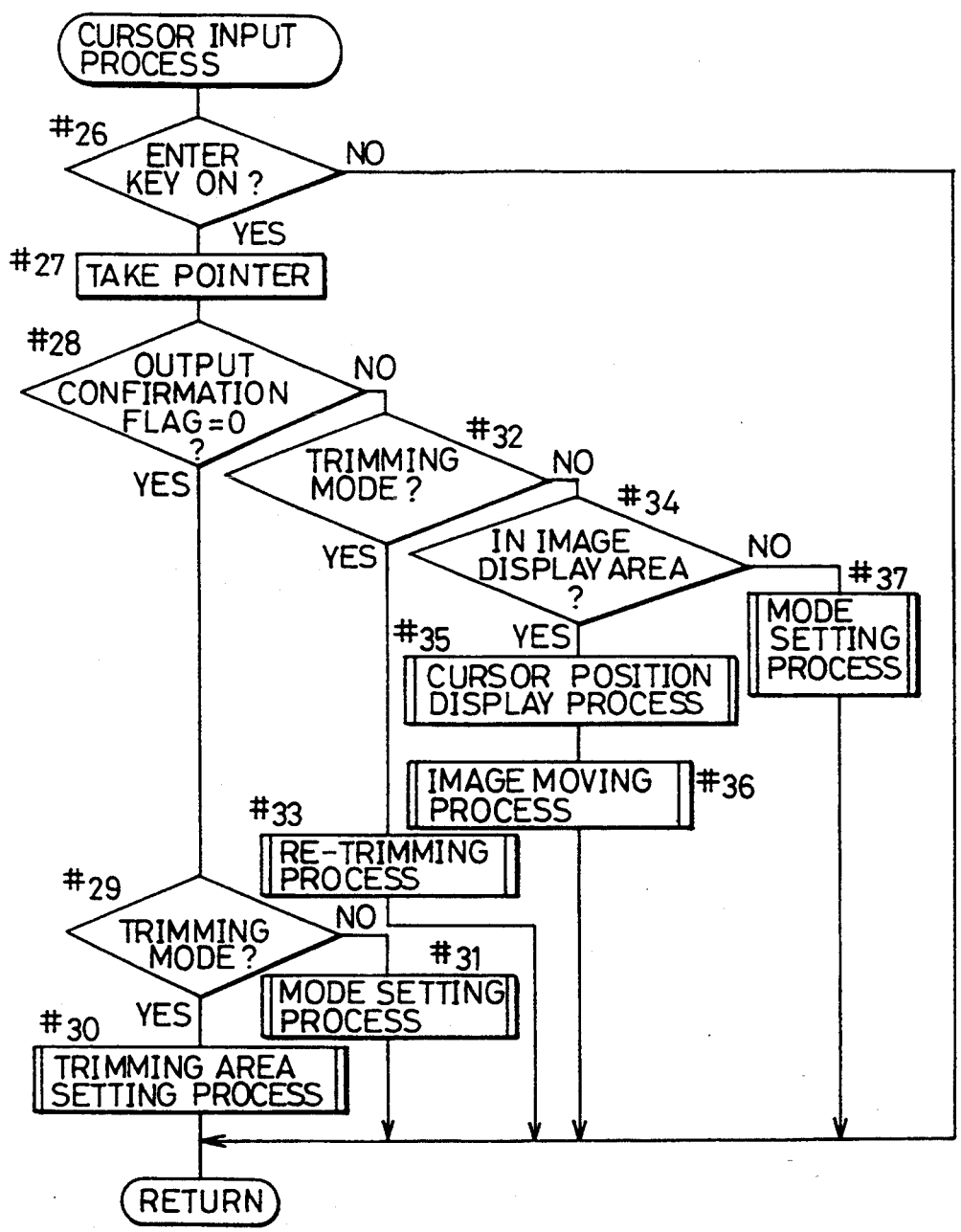
FIG. 27 is a flow chart showing specific contents of a cursor input process routine shown in FIG. 26.

FIG. 27 is a flow chart showing specific contents of the cursor input process of FIG. 26.

At first, whether or not the enter key 72 is on is checked (step #26). If the enter key 72 is turned ON, the coordinate value (cursor pointer) corresponding to the position of the cursor CU at that time is taken (step #27).

By checking the output confirmation flag, whether or not the output confirmation button Z5 has been turned on or not, that is, whether the output has been confirmed or not is determined (step #28). If the output has not yet been confirmed (YES in step #28), then whether or not the trimming mode is set is determined (step #29). If it is the trimming mode, the trimming area setting process is executed (step #30). If it is not the trimming mode, mode setting process for carrying out setting of the operation mode corresponding to the selection of respective buttons Z mentioned above is carried out (step #31).

If the output has been confirmed (NO in step #28), whether or not the trimming mode is set is determined (step #32). If it is the trimming mode, re-trimming process for re-setting the trimming area is effected (step #33).

If it is not the trimming mode, whether or not the position of the cursor CU when the enter key 72 was turned on, that is, the taken value of the cursor pointer is in the image display area E1 is determined (step #34). If it is in the image displaying area E1, cursor position displaying process is carried out (step #35), and image moving process is carried out (step #36). If it is out of the image displaying area E1, the mode setting process is carried out (step #37).

Figure 28:
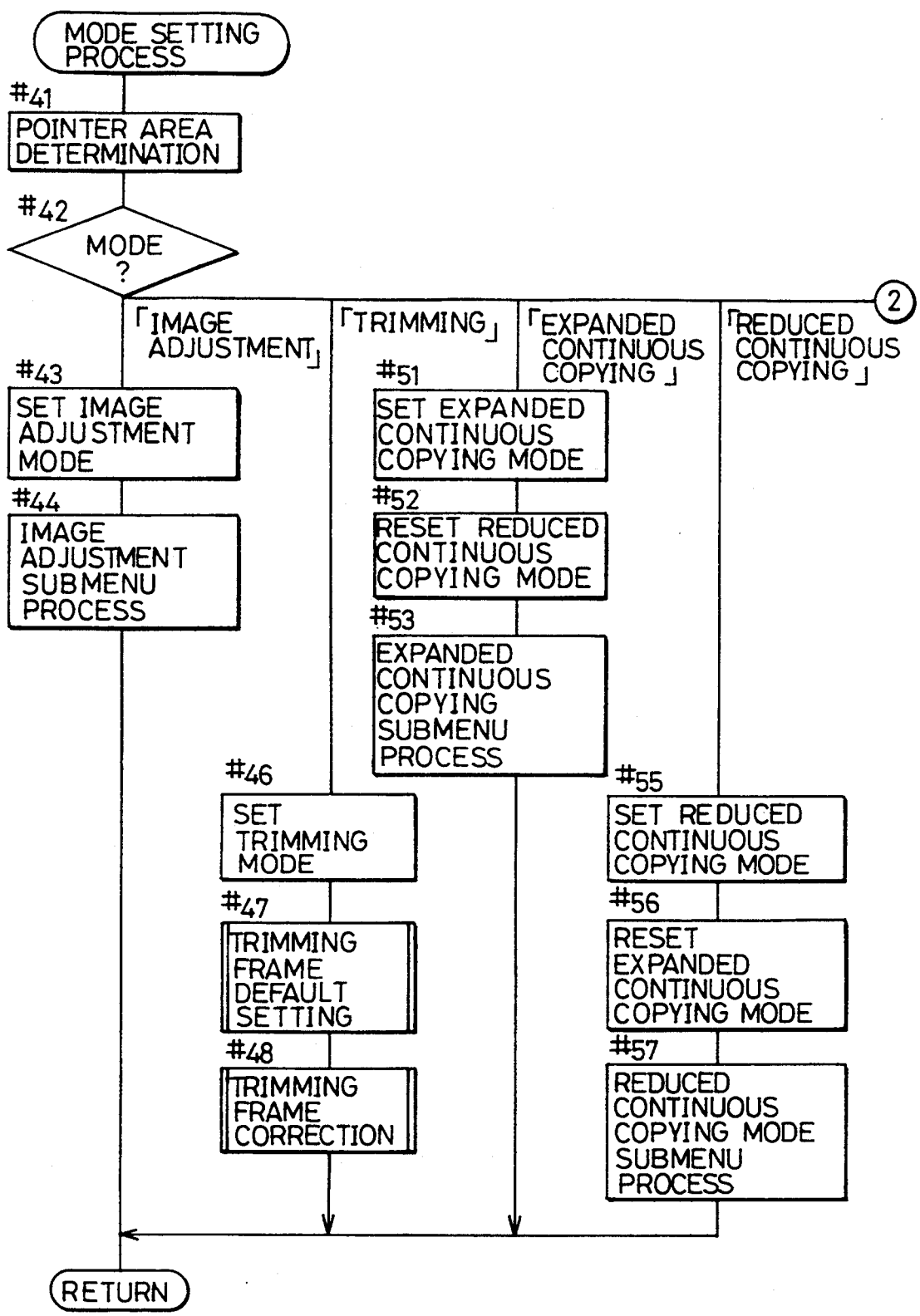
FIG. 28 is a part of the flow chart showing specific contents of a mode setting process in FIG. 27.
Figure 29:
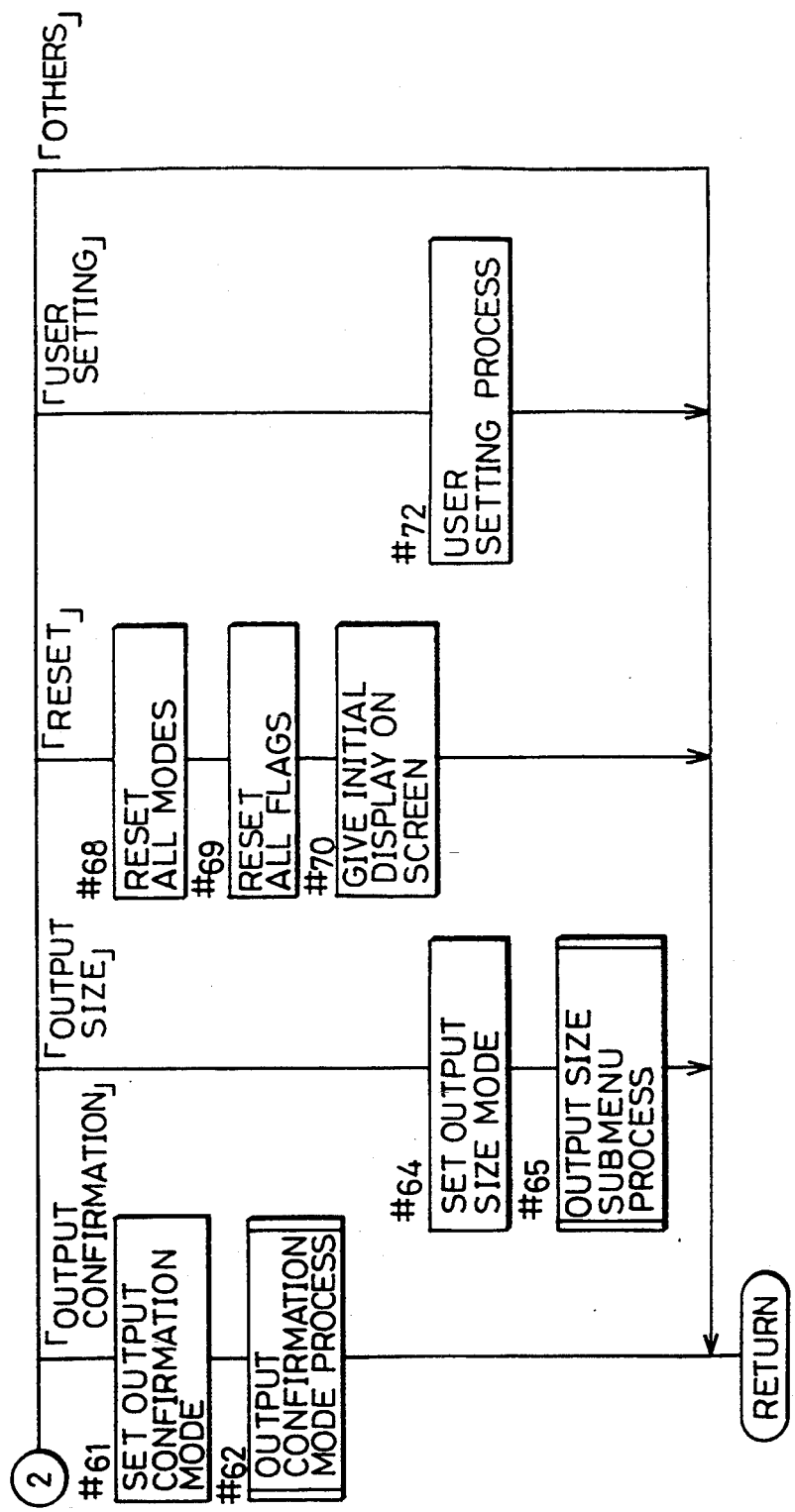
FIG. 29 is another part of the flow chart showing the specific contents of the mode setting process routine of FIG. 27.

FIGS. 28 and 29 are flow charts showing specific contents of the mode setting process of FIG. 27.

By determining the area of the cursor pointer, it is determined which of the buttons Z is depressed for input (steps #41, 42), the mode corresponding to that button Z is set, and necessary process is carried out (steps #43 to 72).

In the image adjusting submenu process (step #44), image density setting or color balance adjustment is carried out. In the trimming frame default setting process (step #47), default values of the trimming frame is set, and in the trimming area setting process (step #48), the trimming area is set. In the reduced continuous copying mode resetting process (step #52), other mode which is not compatible is reset. In the expanded continuous copying submenu process (step #53), the size for reproduced continuous copying is designated. In the expanded continuous copying mode resetting process (step #56), other mode which is not compatible is reset, and in the reduced continuous copying submenu process (step #57), the output mode is designated.

In the output confirmation mode process (step #62), the relation between the sheet and the image to be printed out is displayed on the screen HG. In the output size submenu process (step #65), the size of the output sheet is set. In the all flag reset process (#69), all modes which are presently set are reset, and in the initial display giving process (step #70), the initial display is given. In a user setting process (step #72), the initial mode at the time of resetting or operation environment such as mode memory are set by the user. If there is no input through the button Z, no process is carried out and the flow returns.

Figure 30:
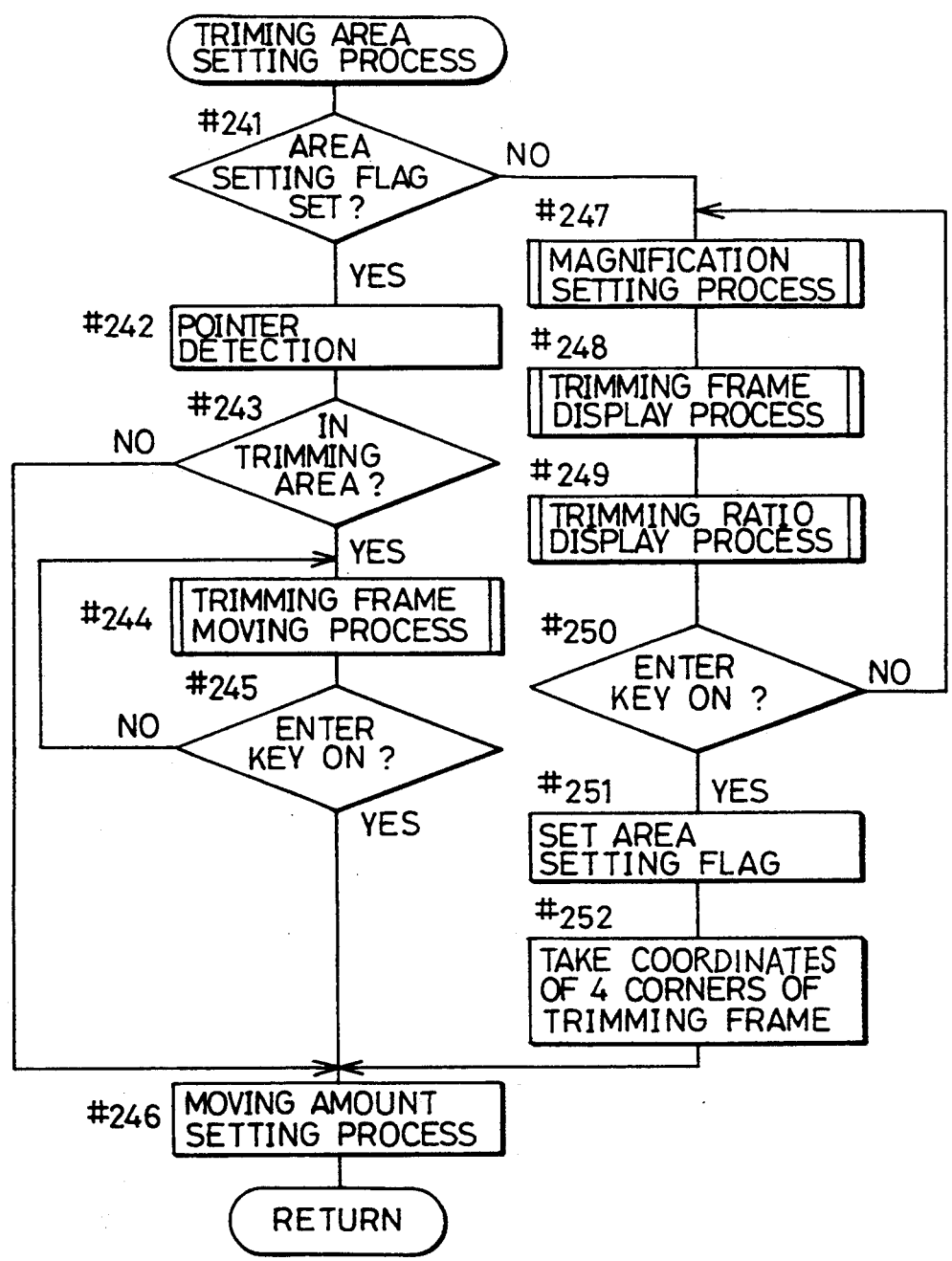
FIG. 30 is a flow chart showing specific contents of trimming area setting process routine of FIG. 27.

FIG. 30 is a flow chart showing specific contents of the trimming area setting process shown in FIG. 27.

At first, whether or not an area setting flat is set is determined (step #241).

If it is YES in step #241, it means that the trimming area has already been set. In that case, the following processes related to moving of the trimming area are carried out.

Namely, the pointer is detected (step #242), and if the pointer is in the trimming area, the trimming frame moving process in which the trimming frame indicating the contour of the trimming area is moved corresponding to the operation of the track ball 71 on the display screen HG is repeated until the enter key 72 is turned on (steps #243 to 245).

When the enter key 72 is turned ON, it means that the operation for moving the trimming frame has completed. Therefore, the amount of movement of the trimmed image for printing at a desired position on the sheet is set corresponding to the position of the trimming area (step #246).

If it is NO in step #241, the following processes related to new setting of the trimming area are carried out.

More specifically, magnification setting process in which a rectangle defined by a first point designated in the image displaying area E1 and a second point at which the cursor CU is positioned as opposing points on the diagonal is regarded as the trimming area and the printing magnification M with respect to this trimming area is calculated and set as the condition for printing (step #247) the trimming frame displaying process for displaying the rectangle as the trimming frame (step #248), and the trimming ratio displaying process for displaying the aspect ratio of the trimming frame (step #249) are repeated until the enter key 72 is turned on. At this time, corresponding to the movement of the second point as the cursor is moved, the trimming frame is transformed and the printing magnification M and the aspect ratio of the trimming frame which are displayed on the window WD are changed.

Thereafter, when the enter key 72 is turned on to establish the second point, the area setting flag is set, and the pointers at four corners of the trimming frame at that time are taken (steps #250 to 252). Then the flow proceeds to the aforementioned step #246.

Figure 31:
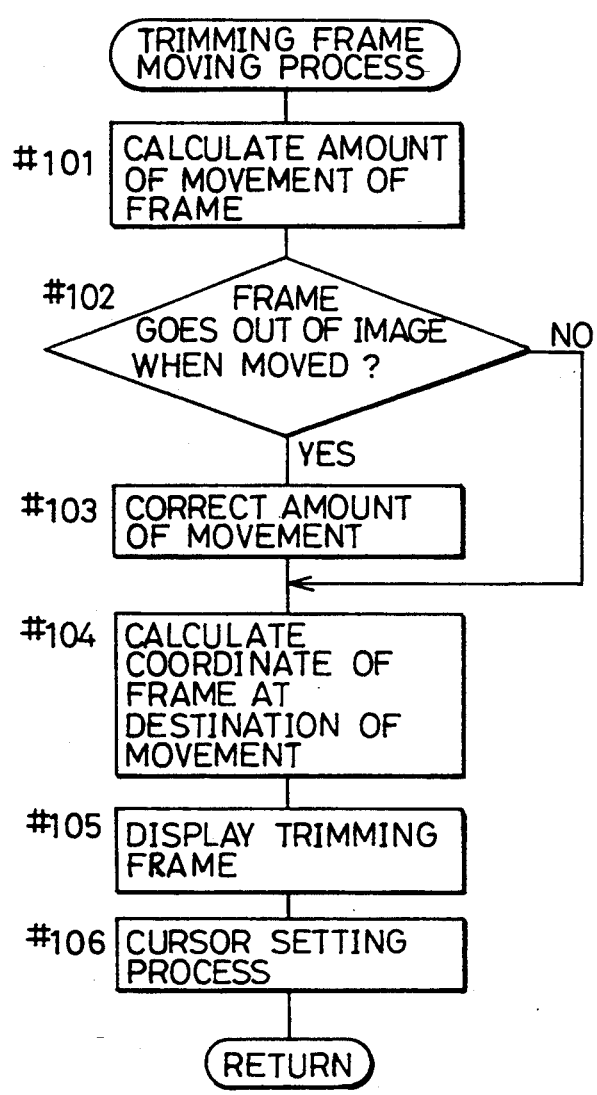
FIG. 31 is a flow chart showing specific contents of the trimming frame moving process routine of FIG. 30.

FIG. 31 is a flow chart showing specific contents of the trimming frame moving process shown in FIG. 30.

At first, based on the cursor pointer taken in last time and based on the cursor pointer at present, the amount of movement of the cursor CU in the X direction (lateral direction of the screen) and Y direction (vertical direction on the screen) are calculated as the amount of movement of the trimming frame TF (step #101).

Thereafter, the value provided by adding the amount of movement to the coordinate value of each of the left, right, upper and lower edges of the trimming frame DF at present is compared with the coordinate value of each of the left, right, upper and lower edges of the image displaying area E1 is compared, and whether or not the trimming frame TF goes out of the image displaying area E1 when the trimming frame TF is moved by the amount of movement is determined (step #102).

If the trimming frame TF goes out of the area, the amount of movement is corrected so that the trimming frame TF is within the image displaying area E1 (step #103).

Thereafter, by an operation of adding the amount of movement which has been corrected as needed, to the coordinate value of the trimming frame TF at present, the coordinate values of four corners of the trimming frame TF after movement are calculated (step #104).

Thereafter, the process for displaying the moved trimming frame TF (step #105) and the cursor selecting process for displaying the cursor CU having the shape of an arrow indicating a prescribed direction corresponding to the position of the trimming frame TF (step #106) are carried out.

Figure 32:
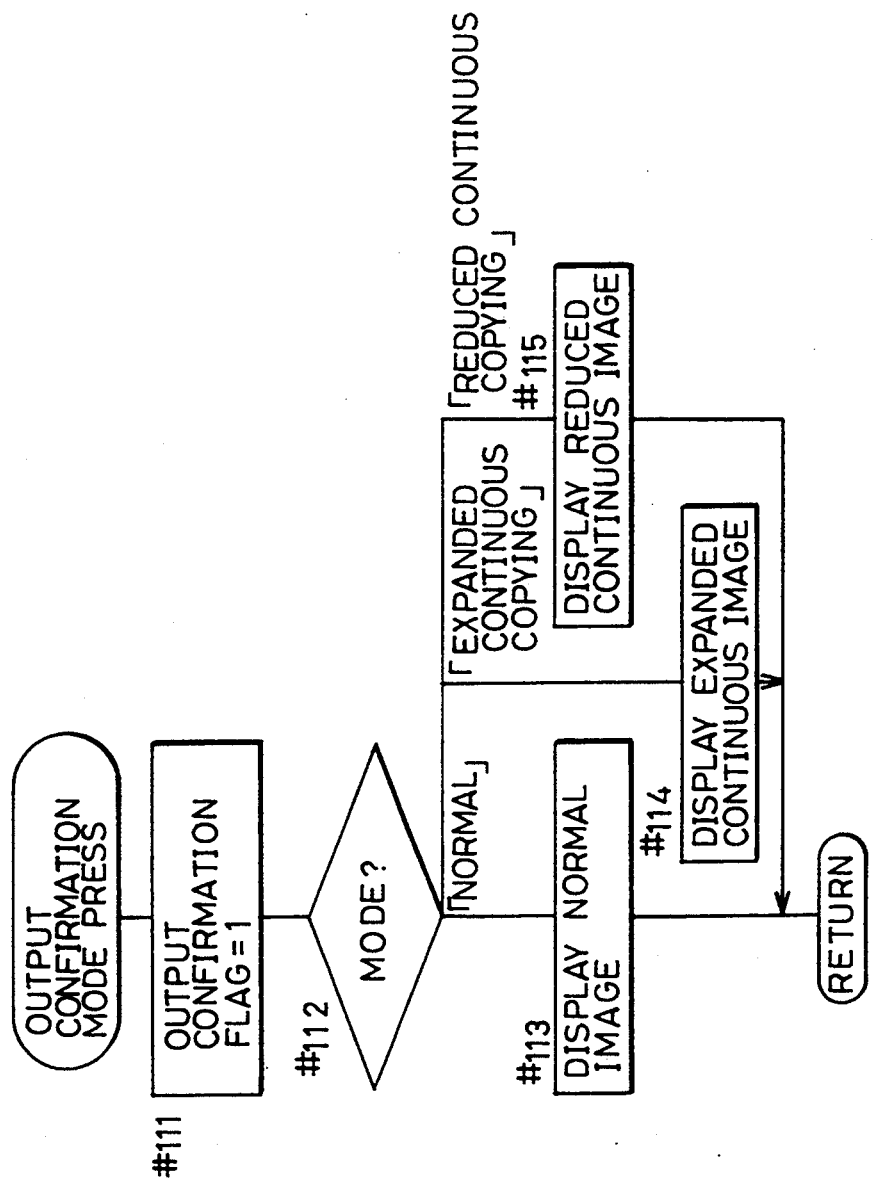
FIG. 32 is a flow chart showing specific contents of the output confirmation mode process routine of FIG. 29.

FIG. 32 is a flow chart showing specific contents of the output confirmation mode process of FIG. 29.

The output confirmation flag is set (step #111), and the normal copy image display (step #113), expanded continuous copying image display (step #114) or reduced continuous copying image display (step #115) is carried out corresponding to the mode set at that time.

Figure 33:
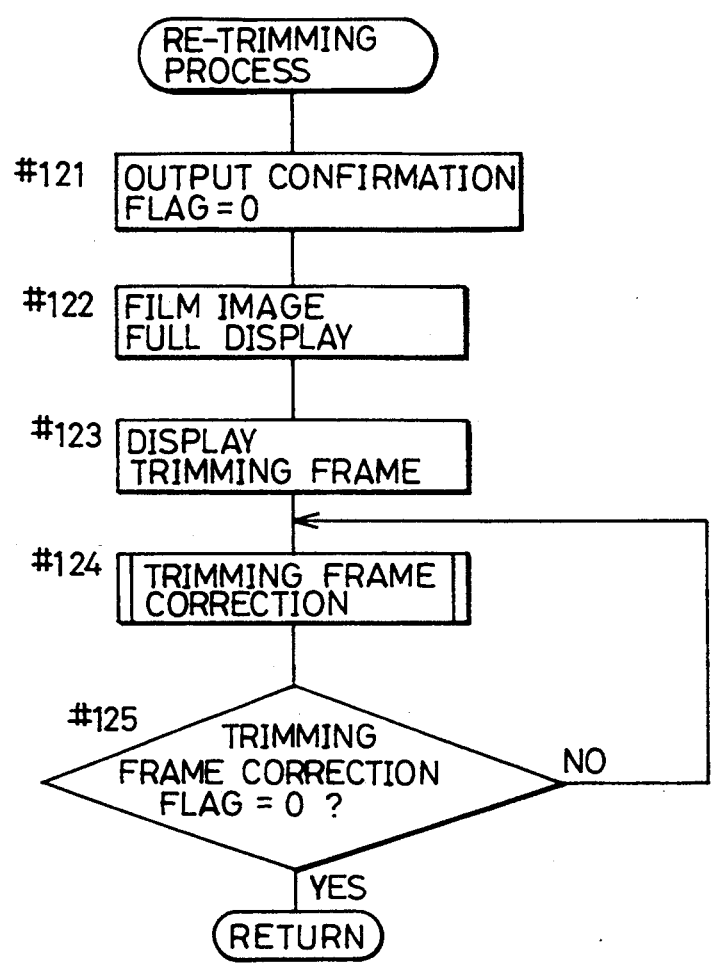
FIG. 33 is a flow chart showing specific contents of re-trimming process routine of FIG. 27.

FIG. 33 is a flow chart showing specific contents of the re-trimming process of FIG. 27.

The re-trimming process is carried out when the trimming area is to be changed after the output is confirmed. First, the output confirmation flag is reset (step #121), the entire film image is displayed (step #122), and over the displayed film image, the trimming frame TF which has been set last time is displayed (step #123).

Based on the displayed trimming frame TF, the trimming frame correcting process is carried out (step #124). The trimming frame correction flag is checked, and until the completion of the trimming frame correcting process, the trimming frame correction is repeated (step #125). While the trimming frame is being corrected, the trimming menu MT shown in FIG. 6(b) is displayed on the screen HG.

Figure 34:
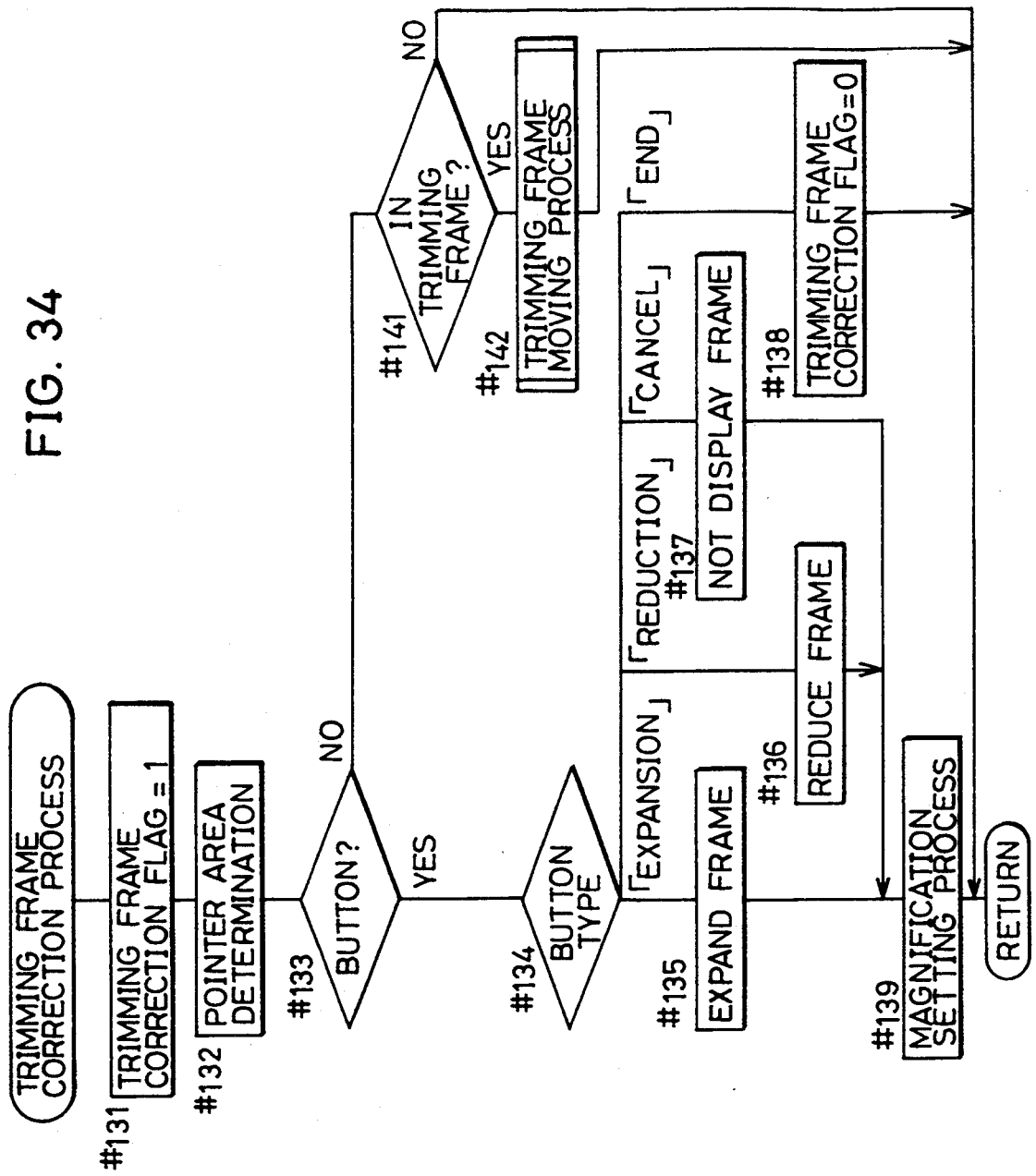
FIG. 34 is a flow chart showing specific contents of the trimming frame correcting process routine of FIG. 33.
Figure 35:
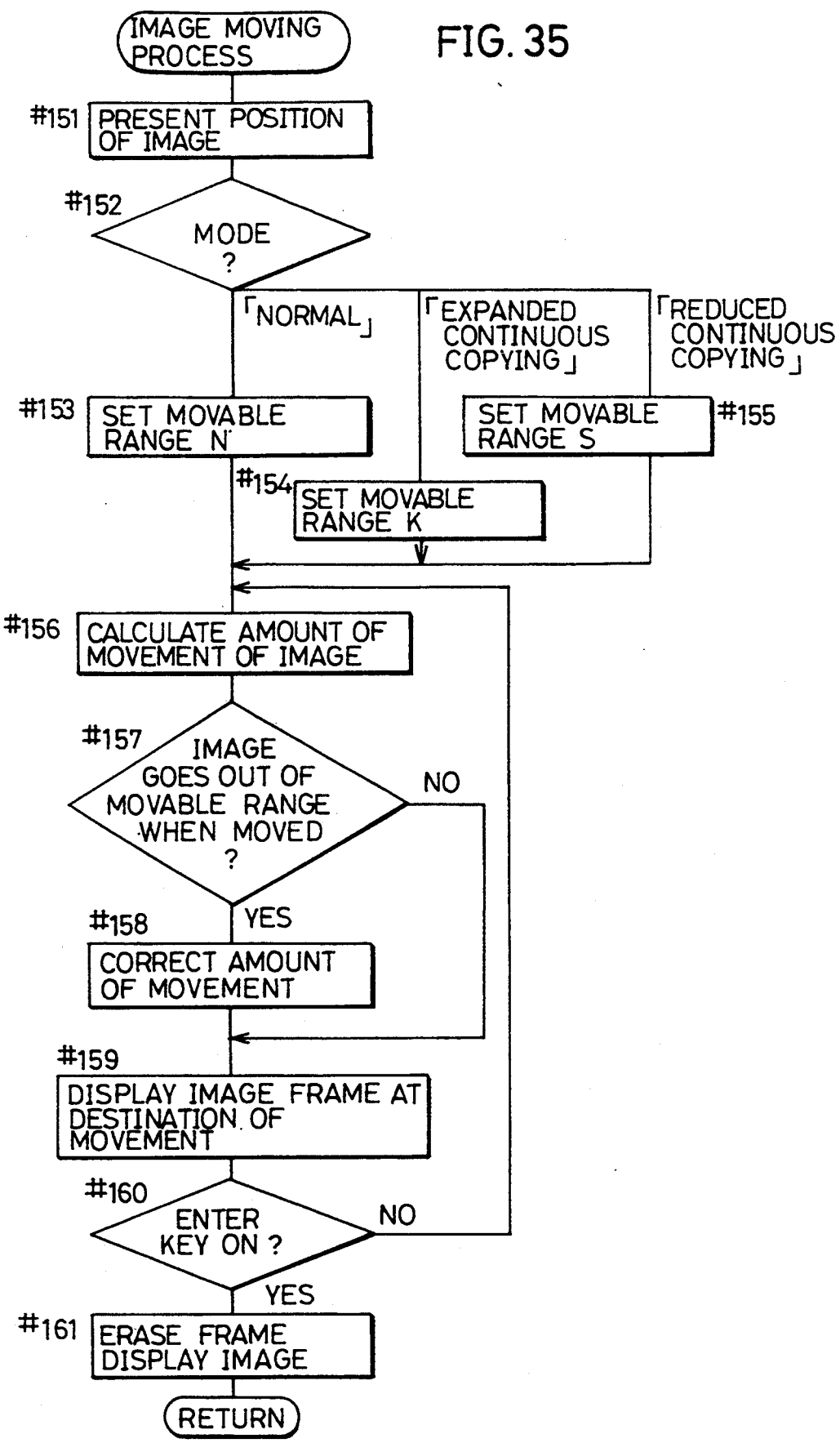
FIG. 35 is a flow chart showing specific contents of the image moving process routine of FIG. 27.

FIG. 34 is a flow chart showing specific contents of the trimming frame correcting process shown in FIG. 35.

First, the trimming frame correcting flag indicating that the trimming frame is being corrected is set (step #131). The area of the cursor pointer is determined, and the position of the cursor CU when the enter key 72 is turned on is determined (step #132).

If the cursor pointer is at the position of any of the buttons Z11 to Z14, process corresponding to the button will be carried out. Namely, if it is at the position of the expansion button Z11, the process for expanding the trimming frame TF is carried out (#135), if it is at the reduction button Z12, the process for reducing the trimming frame TF is carried out (step #136), if it is at the position of the cancel button Z13, the process for not displaying the trimming frame TF is carried out (step #137), and if it is at the position of the end button Z14, the trimming frame correcting flag is reset (step #138). When the process for changing the trimming frame is carried out, the magnification M is also changed. Therefore magnification setting process in which the magnification M is calculated is carried out (step #139).

If the cursor pointer is not at the position of any of the buttons Z11 to Z14, it is determined whether or not the pointer is in the trimming frame TF (step #141). If it is in the trimming frame TF, the trimming frame moving process is carried out (step #142).

FIG. 35 is a flow chart showing specific contents of the image moving process of FIG. 27.

First, the position of the image displayed at present is obtained (step #151). Then the mode which is presently set is determined (step #152). If it is the normal copy mode, the movable range in the normal copy mode, that is, the value of the sheet size selected at present is set (step #153). If it is the expanded continuous copying mode, the movable range in the expanded continuous copying, that is, the value determined by the sheet size selected at present ad the number of output sheets is set (step #154). If it is the reduced continuous copying mode, the movable range in the reduced continuous copying, that is, the value determined by the sheet size selected at present and the number of division of the sheet is set (step #155).

Then, based on the cursor pointer taken last time and on the cursor pointer at present, the amount of movement of the cursor CU in the X and Y directions is calculated as the amount of movement of the image (step #156).

Thereafter, the value provided by adding the amount of movement to the coordinate value of each of the left, right, upper and lower edges of the image at present is compared with the coordinate value of each of the left, right, upper and lower edges of the movable range set in any of the steps #153 to 155, so as to determine whether or not the image goes out of the movable range when the image is moved by the amount of movement (step #157).

If the image goes out of the range, the amount of movement is corrected so that the image is within the movable range (step #158). Then, the corrected amount of movement is added to the coordinate value of the image at present to calculate the coordinate values of four corners of the image after movement, and a frame indicating that position is displayed (step #159).

These processes are repeated until the enter key 72 is turned on, and as the cursor CU is moved, a frame indicating the destination of movement of the image is displayed.

When the enter key 72 is turned ON thereafter (YES in step #160), the frame of the image is erased and the image is displayed instead (step #161).

Figure 36:
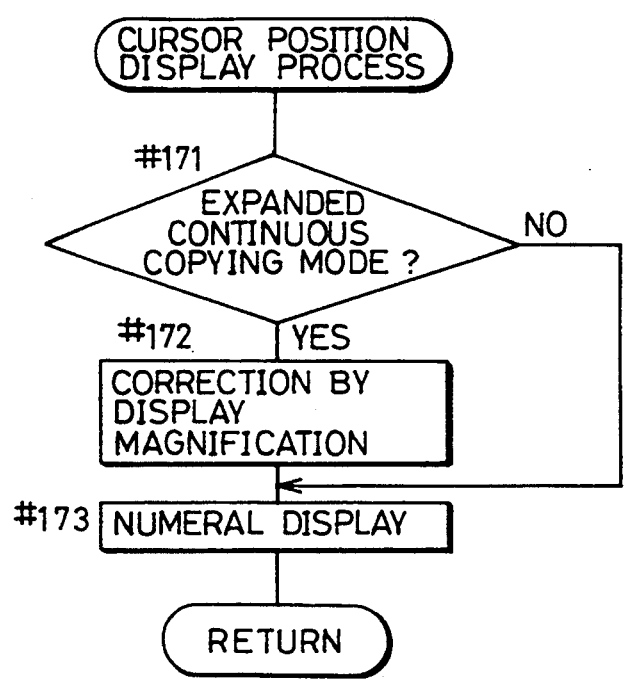
FIG. 36 is a flow chart showing specific contents of the cursor position display process routine of FIG. 27.

FIG. 36 is a flow chart showing specific contents of the cursor position displaying process of FIG. 27.

The cursor position displaying process is to display the position of the cursor CU when the enter key 72 is turned on in terms of numerals equivalent to the position (length) on the sheet.

When it is not the expanded continuous copying mode (NO in step #171), 1 dot on the screen HG corresponds to 1 mm on the sheet, and therefore the coordinate value of the cursor CU (the dot number on the screen HG) is displayed as it is as the position on the sheet (step #173).

If it is the expanded continuous copying mode (YES in step #171), correction in which an inverse of the magnification for display Mdisp is multiplied by the coordinate value of the cursor CU is carried out (step #172), and the result is displayed (step #173).

For example, when two sheets A0 size (1680×1188 mm) are to be displayed on the screen HG (420×297 dots), 1 dot of pixel on the screen HG corresponds to 4 mm, and therefore magnification for display Mdisp is "¼". Therefore, in this case, the coordinate value of, for example, the lower left end of the image displaying area E1 (420, 297) is multiplied by four and displayed as X=1680 (mm) and Y=1188 (mm).

In the above described embodiment, the output confirmation button Z5 corresponds to the confirmation input means D1 of the present invention; the trimming button Z2 and the enter key 72 when the cursor CU is in the image displaying area E1 correspond to the change input means D2 of the present invention; the control portion 200 corresponds to the display control means A and trimming region setting means C; and the image data stored in the input image memory 212 corresponds to the input image B, respectively.

In the above described embodiment, the trimmed image is expanded in the displays for confirmation G1 and G2. However, only the trimmed image may be displayed with images other than the trimmed image erased. The structure of the control portion 200, the timings of operation, process contents, order and contents of the flow chart, the structure of the screen HG, the structure of the film scanner 1 and so on are not limited to those described above and they can be appropriately modified.

Figure 37:
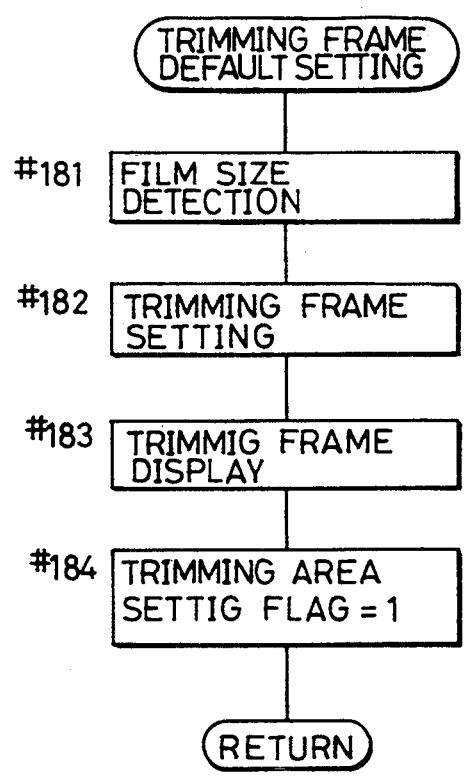
FIG. 37 is a flow chart showing an example of the specific contents of the trimming frame default setting process routine of FIG. 28.

FIG. 37 is a flow chart showing one example of the specific contents of the trimming frame default setting process shown in FIG. 28.

Here the process for automatically setting the trimming frame TFD in accordance with the default value corresponding to the image dimension ratio of the film F is carried out.

First, by means of type detecting sensors 52a to 52d, the size (type) of the film F presently selected is detected (step #181). The following table 2 shows an example of the relation between the size of the film F and the states of output signals from the type detecting sensors 52a to 52d.

TABLE 2

| TYPE DETECTING SENSOR | | | | |
|---|---|---|---|---|
| 52a | 52b | 52c | 52d | CONTENTS |
| H | H | L | L | 35 mm continuous |
| H | L | L | L | 35 mm mount |
| L | H | L | L | 6 × 9 |
| L | H | L | H | 6 × 4.5 |
| L | H | H | L | 6 × 6 |
| L | H | H | H | 6 × 7 |
| L | L | L | L | 4" × 5" |
| H | H | H | H | no film loaded |

Based on the detected size of the film F, the coordinate values Xt1, Xt2, Yt1 and Yt2 of the trimming frame TFD are calculated (step #182), the trimming frame TFD is displayed on the screen HG (step #183), and the trimming area setting flag is set (step #184).

In step #182, the coordinate values can be calculated in accordance with the equations mentioned above. However, the types of the film F which can be set are limited in the present invention. Therefore, the values have been calculated previously and the result of calculation have been stored in the ROM. Therefore, the coordinate values are read from the ROM based on the detected size of the film F.

Figure 38:
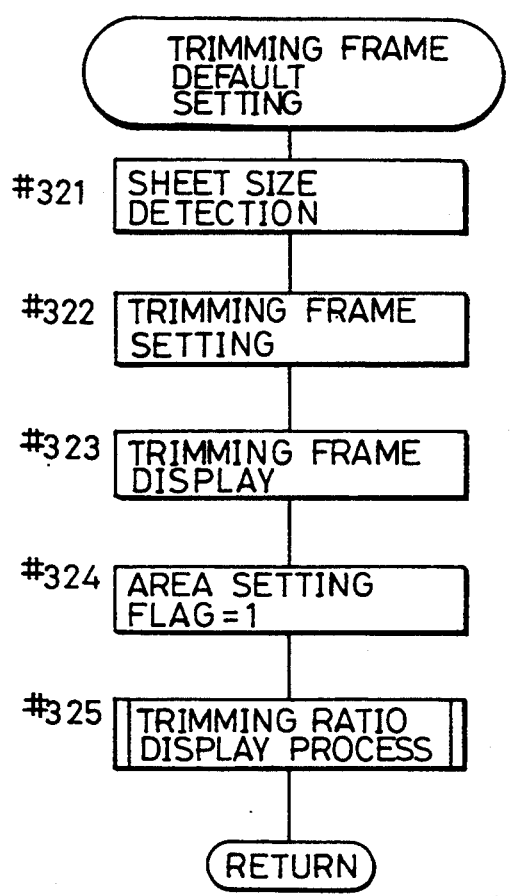
FIG. 38 is a flow chart showing another example of the specific contents of the trimming frame default setting process routine of FIG. 28.

FIG. 38 is a flow chart showing another example of the specific contents of the trimming frame default setting process shown in FIG. 28.

The trimming frame default setting process is to automatically set the trimming frame TFD corresponding to the aspect ratio RS of the area in which printing is possible (print valid area) of the output sheet.

First, the size of the output sheet presently selected is detected, and referring to the table TB2 stored in the ROM 202 (see FIG. 18), the coordinates (Xt1 Xt2, Yt1, Yt2) of the trimming frame corresponding to the size of the output sheet are calculated, the trimming frame is set (step #322), and the trimming frame thus set is displayed (step #323).

In this process, if the size of the output sheet is known, the values may be calculated in accordance with predetermined equations in advance. However, since the types of the output sheet to be selected are limited, the results of calculation may be stored in the ROM 202.

Then, the area setting flag is set (step #324), and the aspect ratio (trimming ratio) RS is displayed by the trimming ratio displaying process (step #325).

Specific examples of the setting of the trimming frame TFD in accordance with the default value are shown in FIGS. 13, 14, 17 and 19. In FIG. 19, control in the subscanning direction is carried out with the film F3 of 35 mm size used as a reference. Therefore, the tip end of the film image of the films F1 and F2 having the 6 cm size and 4×5 inch size, respectively, do not correspond to the first address in the subscanning direction.

The size of the image displaying area E1 of the screen HG is set as size of image display in the main scanning direction=Dx=300 (dots)

size of image display in the subscanning direction=Dy=450 (dots).

First, the default values of the trimming frame are calculated based on the film size and the area in which printing is possible of the output sheet.

[Films F3 and F4 with 35mm size]
Image display width in the main scanning direction of 35 mm film = Dx35 = 300
Image display width in the subscanning direction of 35 mm film = Dy35 = 450
Number of pixels read in the main scanning direction of 35 mm film = Px35 = 4096
Number of pixels read in the subscanning direction of 35 mm film = Py35 = 6145.
As for the trimming area on the screen HG,
when aspect ratio RS > 0.666
Xt1 = 1
Xt2 = Dx35
Yt1 = (Dy − Dx35 / aspect ratio) / 2
Yt2 = (Dy + Dx35 / aspect ratio) / 2
when aspect ratio RS ≦ 0.666
Xt1 = (Dx − Dy35 × aspect ratio) / 2
Xt2 = (Dx + Dy35 × aspect ratio) / 2
Yt1 = 1
Yt2 = Dy35.
As for the pixel address on the film,
Fxt1 = (Xt1 − 1) × (Px35 − 1) / (Dx35 − 1) + 1
Fxt2 = (Xt2 − 1) × (Px35 − 1) / (Dx35 − 1) + 1
Fyt1 = (Yt1 − 1) × (Py35 − 1) / (Dy35 − 1) + 1
Fyt2 = (Yt2 − 1) × (Py35 − 1) / (Dy35 − 1) + 1

[Film F2 with 6 cm size]
Image display width in the main scanning direction of 6 × 4.5 cm film = Dx645 = 300
Image display width in the subscanning direction of 6 × 4.5 cm film = Dy645 = 225
Number of pixels read in the main scanning direction of 6 × 4.5 cm film = Px645 = 4096
Number of pixels read in the subscanning direction of 6 × 4.5 cm film = Py645 = 3072.
As for the trimming area on the screen HG,
when aspect ratio RS < 1.33
Xt1 = (Dx − (Yt2 − Yt1) × aspect ratio) / 2
Xt2 = (Dx + (Yt2 − Yt1) × aspect ratio) / 2

-continued $Yt1 = (Dy - Dy645) / 2$
$Yt2 = (Dy + Dy645) / 2$
When aspect ratio $RS \geq 1.33$
$Xt1 = 1$
$Xt2 = Dx645$
$Yt1 = (Dy - Dx645 / \text{aspect ratio}) / 2$
$Yt2 = (Dy + Dx645 / \text{aspect ratio}) / 2$
As for the pixel address on the film
$Fxt1 = (Xt1 - 1) \times (Px645 - 1) / (Dx645 - 1) / + 1$
$Fxt2 = (Xt2 - 1) \times (Px645 - 1) / (Dx645 - 1) / + 1$
$Fyt1 = (Yt1 - 1) \times (Py645 - 1) / (Dy645 - 1) / + 1$
$Fyt2 = (Yt2 - 1) \times (py645 - 1) / (Dy645 - 1) + 1$

[Film F1 with 4 × 5 inch size]
Image display width in the main scanning direction of
4 × 5 inch film = $Dx45 = 300$
Image display width in the subscanning direction of
4 × 5 inch film = $Dy45 = 375$
Number of pixels read in the main scanning direction
of 4 × 5 inch film = $Px45 = 4096$
Number of pixels read in the main scanning direction
of 4 × 5 inch film = $Py45 = 5120$.

As for the trimming area on the screen HG,
when the aspect ratio $RS < 0.8$
$Xt1 = (300 - (Yt2 - Yt1) \times \text{aspect ratio}) / 2$
$Xt2 = (300 + (Yt2 - Yt1) \times \text{aspect ratio}) / 2$
$Yt1 = (450 - Dy45) / 2$
$Yt2 = (450 + Dy45) / 2$
When the aspect ratio $RS \geq 0.8$
$Xt1 = 1$
$Xt2 = Dx45$
$Yt1 = (450 - Dx45 / \text{aspect ratio}) / 2$
$Yt2 = (450 + Dx45 / \text{aspect ratio}) / 2$
As for the pixel address on the film
$Fxt1 = (Xt1 - 1) \times (Px45 - 1) / (Dx45 - 1) + 1$
$Fxt2 = (Xt2 - 1) \times (Px45 - 1) / (Dx45 - 1) + 1$
$Fyt1 = (Yt1 - 1) \times (Py45 - 1) / (Dy45 - 1) + 1$
$Fyt2 = (Yt2 - 1) \times (Py45 - 1) / (DY45 - 1) + 1$ As mentioned above, there are films F of various sizes, and the aspect ratios RS of respective sizes differ from each other. Therefore, when the film image is read and displayed on the screen HG, the display area thereof naturally differs. The sizes of the films F and the corresponding display areas are shown in FIG. 19.

In this embodiment, in order to facilitate calculation of the trimming area, the read control of the film image is based on 4096×6144 dots which corresponds to the film F3 of 35 mm size having the smallest image dimension ratio. As for films having smaller aspect ratios RS, control is effected such that the image data at the central portion only are regarded as read data in the subscanning direction as shown in FIG. 19. More specifically, if the film having small aspect ratio RS is read, portions of the film carrier FC are read at the start and at the end of reading in the subscanning direction.

By such setting, the coordinates of the trimming area on the film image can be easily calculated when further trimming is to be done, by multiplying the values of the coordinate of the trimming area set on the screen HG by 13.65 (=4096/300).

In the above described embodiment, because of the feature of the printer apparatus, printing in 11 mm (7 mm in the front end, 4 mm in the rear end) in the subscanning direction and 6 mm (3 mm in left and right ends each) in the main scanning direction is impossible, regardless of the size of the sheet, and thus blank areas are generated. One reason for this is that a blank must be provided in order to prevent attachment of toner to the transfer drum for chucking the sheet on the transfer drum.

The aspect ratio RS of generally used output sheets is 0.707 or 1.414 regardless of the size. However, because of the above described reason, the aspect ratio RS changes slightly corresponding to the sheets size. The aspect ratios RS taking into account the above mentioned blank areas are shown in column G of FIG. 17. The trimming area (trimming frame TFD) in accordance with the default value is set based on the relation between the image dimension ratio shown in FIG. 19 and the aspect ratio RS shown in FIG. 17. Equations for calculating the trimming area on the screen HG and the trimming area on the film image will be given in the following.

When aspect ratio RS = image dimension ratio,
trimming area on the screen HG
$Xt1 = 1$
$Xt2 = 300$
$Yt1 = Y1$
$Yt2 = Y2$
trimming area on the film image
$Fxt1 = 1$
$Fxt2 = 4096$
$Fyt1 = Fy1$
$Fyt2 = Fy2$
when aspect ratio RS > image dimension ratio,
trimming area on the screen HG
$Xt1 = 1$
$Xt2 = 300$
$Yt1 = (450 - 300 / \text{aspect ratio}) / 2$
$Yt2 = 450 - Yt1$
trimming area on the film image
$Fxt1 = 1$
$Fxt2 = 4096$
$Fyt1 = (6144 - 4096 / \text{aspect ratio}) / 2$
$Fyt2 = 6144 - Fyt1$
when aspect ratio RS < image dimension ratio,
trimming area on the screen HG
$Xt1 = [300 - (300 \times \text{aspect ratio} / \text{image dimension ratio})] / 2 + 1$
$Xt2 = 301 - Xt1$
$Yt1 = Y1$
$Yt2 = Y2$
trimming area on the film image
$Fxt1 = [4096 - (4096 \times \text{aspect ratio} / \text{image dimension ratio})] / 2 + 1$
$Fxt2 = 4097 - Fxt1$
$Fyt1 = Fy1$
$Fyt2 = Fy2$ As for the determination of the trimming area, the table TB2 of the trimming area in accordance with the default value may be prepared for respective film sizes and respective output sheet sizes to be stored in the ROM as shown in FIG. 18, or the values may be provided by calculation using the above equations based on the film size and the size of the output sheet.

In the above described embodiment, in order to give good appearance of the image on the screen HG, the image displaying area is set such that the image is displayed on the central portion of the screen HG. In order to make simple the calculation, portions not corresponding to the image are read at the start and at the end in the scanning direction when the film has large image dimension ratio with the image reading area of the scanner positioned at the center in the subscanning direction of the film image. However, the start position of reading by the scanner may be always at the front end of the film image.

In that case, the equations for calculating the trimming area in accordance with the default value are as follows.

$Fxt1 = 1$    $Fy1 = 1$
$Fx2 = 4096$  $Fy2 = 4096 / \text{image dimension ratio}$
when aspect ratio RS = image dimension ratio -continued

```
Fxt1 = 1        Fyt1 = 1
Fxt2 = 4096     Fyt2 = 4096 / image dimension ratio
when aspect ratio RS > image dimension ratio
Fxt1 = 1        Fyt1 = 1
Fxt2 = 4096     Fyt2 = 4096 / aspect ratio
when aspect ratio RS < image dimension ratio
   Fxt1 = [4096 − (4096 × aspect ratio / image dimension
ratio)] / 2 + 1
   Fxt2 = 4097 − Fxt1
   Fyt1 = 1
   Fyt2 = 4096 / image dimension ratio
```

The description returns to the content of the flow chart.

Figure 39:
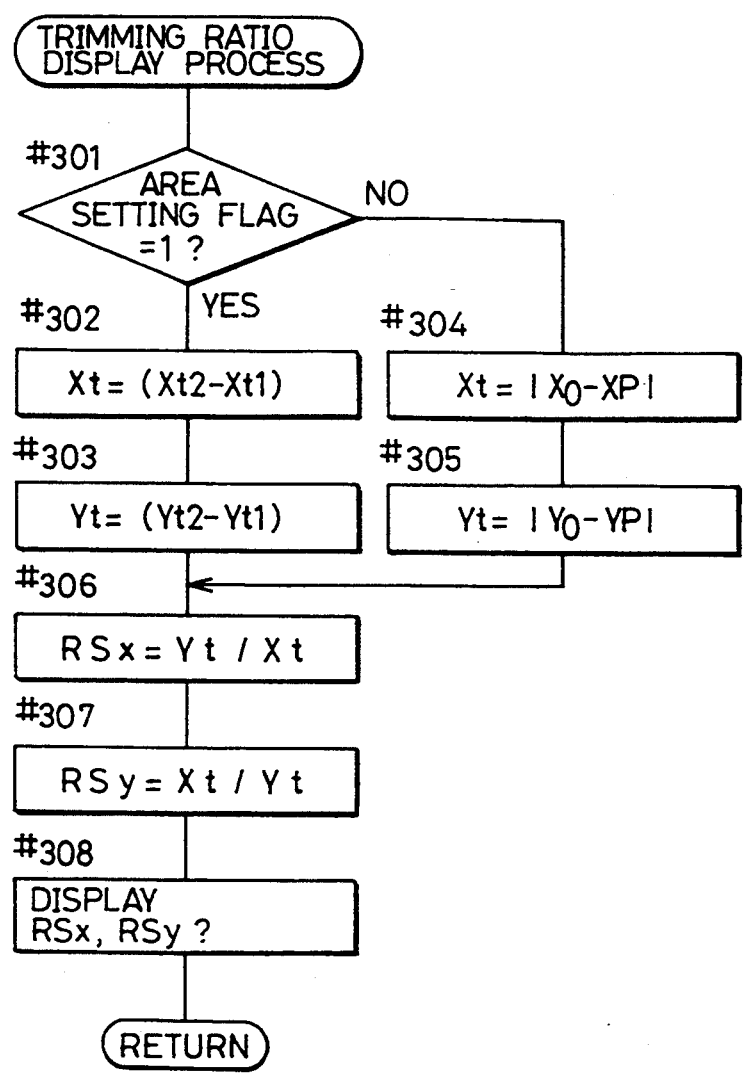
FIG. 39 is a flow chart showing specific contents of the trimming ratio display process routine of FIG. 30.

FIG. 39 is a flow chart showing specific contents of the trimming ratio displaying process of FIG. 30.

First, whether the trimming frame has been set or not at present is determined by the area setting flag (step #301). If the trimming frame has been set (YES in step #301), the trimming width Xt in the X direction and the trimming width Yt in the Y direction are calculated based on the X coordinate and Y coordinate of the trimming frame (steps #302 and 303).

If the trimming has not yet been set (NO in step #301), the trimming width Xt in the X direction and the trimming width Yt in the Y direction are calculated based on the X and Y coordinates during setting of the trimming frame and on the position of the pointer saved last time (steps #304 and 305).

Then the trimming ratio (aspect ratio) RSx based on the main scanning direction and the trimming ratio RSy based on the subscanning direction are calculated (steps #306 an 307), and the calculated trimming ratio (aspect ratio) RSx and RSy are displayed (step #308).

For example, in FIG. 15, if the size of the trimming frame TF is Xo=50, Xp=90, Yo=180 and Yp=250, then $$Xt = 90 - 50 = 40$$

$$Yt = 250 - 180 = 70$$

and therefore, $$RSx = 70/40 = 1.750$$

$$RSy = 40/70 = 0.571$$

Accordingly, the aspect ratio RS is displayed as 1.000:1.750 or 0.571:1.000.

Figure 40:
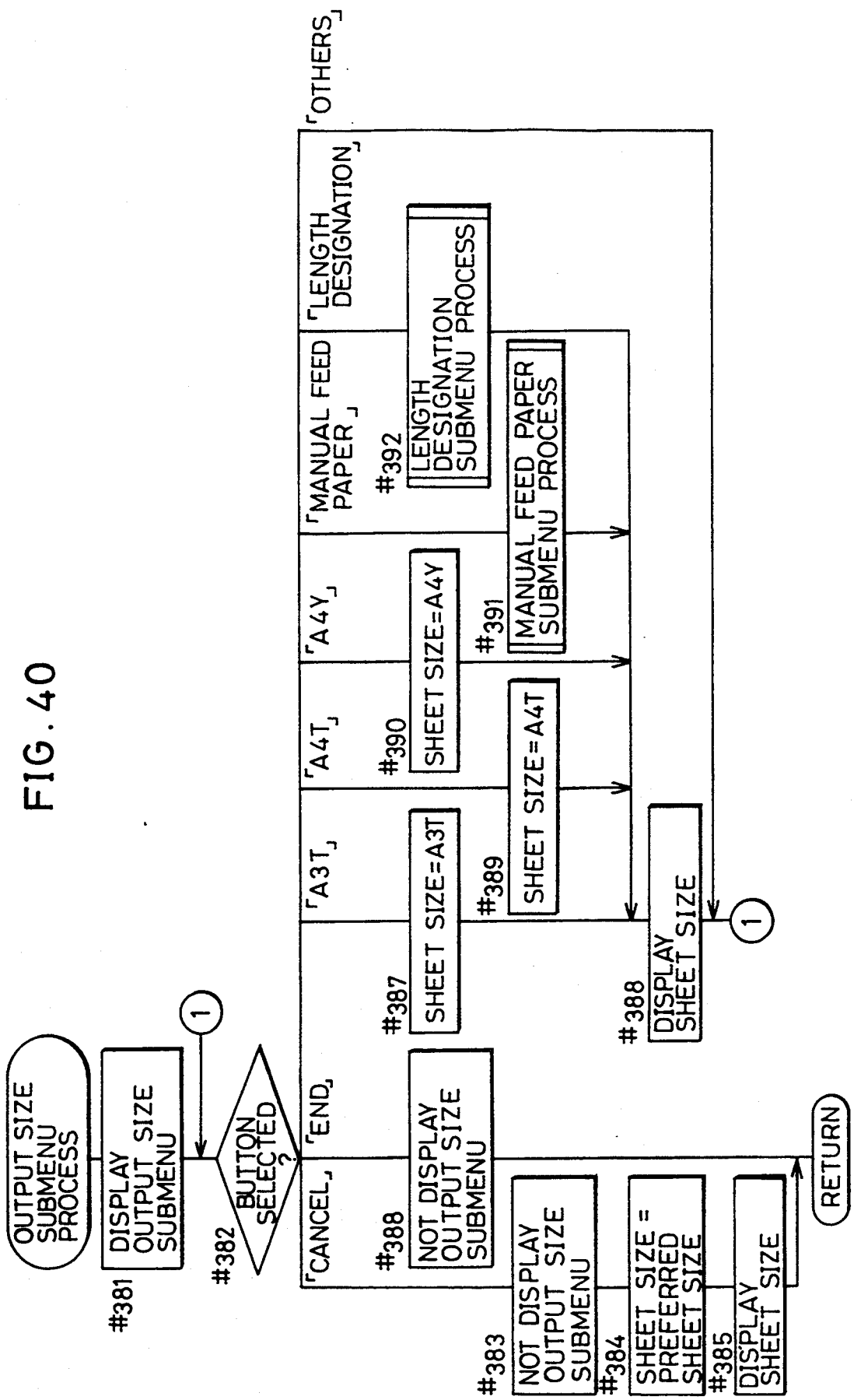
FIG. 40 is a flow chart showing specific contents of the output size submenu process routine of FIG. 29.

FIG. 40 is a flow chart showing specific contents of the output size submenu process shown in FIG. 29.

First, the output size submenu MS (see FIG. 16) is displayed (step #381). Then it is determined which of the buttons Z on the output size submenu MS is depressed (step #382), and the process corresponding to the depressed button Z is carried out.

When the A3T button Z21 is depressed, the output sheet is set to A3T (step #387). When the A4T button Z22 is depressed, the output sheet is set to A4T (step #389). When the A4Y button Z23 is depressed, the output sheet is set to A4Y (step #390). By the communication with the printer of the main routine, signals corresponding to the setting are transmitted to the printer apparatus, and the output sheet of the set size is selected.

When sheet manual feed button Z24 is depressed, a submenu process for setting the size of the sheet to be manually fed is carried out (step #391). When the length designation button Z25 is depressed, a length designation submenu process for directly designating the size of the output image is carried out (step #392). The set output sheet size SP is displayed on the message displaying portion Y1 (step #388).

When a cancel button Z26 is depressed, the output size submenu MS is not displayed (step #383), the output sheet size is set to the preferred sheet size set in the user setting mode (step #384), and the size of the sheet is displayed (step #385).

When a finish button Z27 is depressed, the output size submenu MS is not displayed (step #386), and the process ends.

In the above described embodiment, in the trimming mode, a trimming frame TFD having the aspect ratio RS same as the aspect ratio RS of the area permitting printing of the designated output sheet being set as the default value is displayed, and the size of the trimming frame TFD can be changed while keeping constant the aspect ratio RS. Therefore, trimming can be done very easily to form the image entirely over the area permitting printing of the output sheet.

Since the aspect ratio RS is indicated by the numeral on the screen HG by the aspect ratio display DRS, the aspect ratio RS of the trimming frame TF can be known accurately by the aspect ratio display DRS even if the trimming frame TF is set by the operator and not the trimming frame TFD of the default value is used. Accordingly, the trimming area can be appropriately set corresponding to the area permitting printing of the output sheet. Further, since two different aspect ratios RS based on different references are displayed on the aspect ratio display DRS, it is easy to make the trimming area accordant with the size of the area in which printing is possible of the output sheet.

Figure 41:
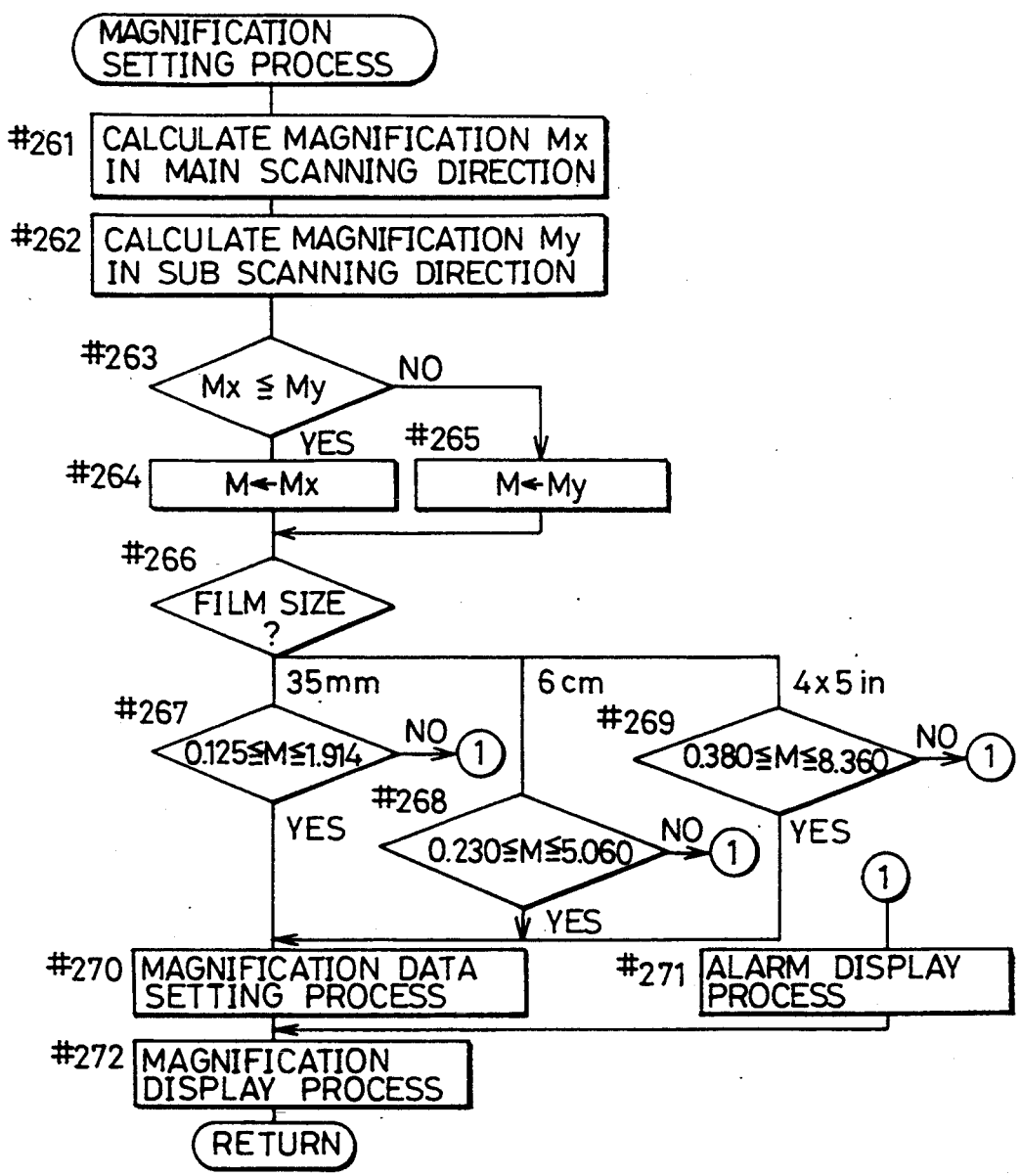
FIG. 41 is a flow chart showing specific contents of the magnification setting process routine of FIG. 30.

FIG. 41 is a flow chart showing specific contents of the magnification setting process of FIG. 30.

In this routine, the magnification when the image corresponding to the displayed trimming frame is to be printed fully on the sheet of the designated size is calculated in the main and subscanning directions.

More specifically, the magnifications Mx and My in the main and subscanning directions, respectively, which are represented by the equations (1) and (2) are calculated (steps #261 and 262), where Xpp and Ypp represent the length of the sheet in the main and subscanning directions, respectively, and (Xo, Yo), (Xo, Yp), (Xp, Yo) and (Xp, Yp) represent XY coordinates at four corners of the trimming frame.

Magnification $Mx$ in the main scanning
direction $= Xpp / |Xo - Xp|$ \hfill (1)

Magnification $My$ in the subscanning
direction $= Ypp / |Yo - Yp|$ \hfill (2)

Then, in order to print out the whole trimming image, that is, in order to prevent partial missing of the trimmed image during printing, the two magnifications Mx and My are compared with each other. The smaller one of these two magnifications is stored in a prescribed register as a printing magnification M (steps #263 to 265).

Thereafter, whether or not the printing magnification M is within a predetermined range allowing printing of a prescribed level of quality is checked referring to the detected size of the film F, as will be described later (steps #266 to 269).

More specifically, when the film size is 35 mm, whether or not the printing magnification M is, for example, in the range of 0.125 to 1.914 or not is determined. If the film size is 6 cm, whether or not the printing magnification M is, for example, in the range of 0.23 to 5.06 is determined. If the film size is 4×5 inch, whether or not the printing magnification M is, for example, in the range of 0.38 to 8.36 is determined.

If the printing magnification M is in the prescribed range, it is set as the printing condition (magnification data) of printing the trimming image by the electrical magnification and by the change of the speed of scanning. If alarm display, which will be described later, is also provided at this time, erasure of this display (that is, releasing of alarm) is also effected (step #270). The printing magnification M is displayed in the window WD on the screen HG (step #272).

If the printing magnification M is out of the prescribed range, alarm display process is executed (step #271) in which an alarm message such as "magnification too large" is displayed on the message displaying portion Y1 of the screen HG so as to let the operator know that the trimming area is too large or too small with respect to the sheet size, and then the flow proceeds to the step #272.

In step #270, the printing magnification M is changed to one (which is nearer to the printing magnification M (the value before change)) of the upper and lower limit values of the prescribed range corresponding to the film size, and the changed printing magnification M is set as the printing condition.

Figure 42:
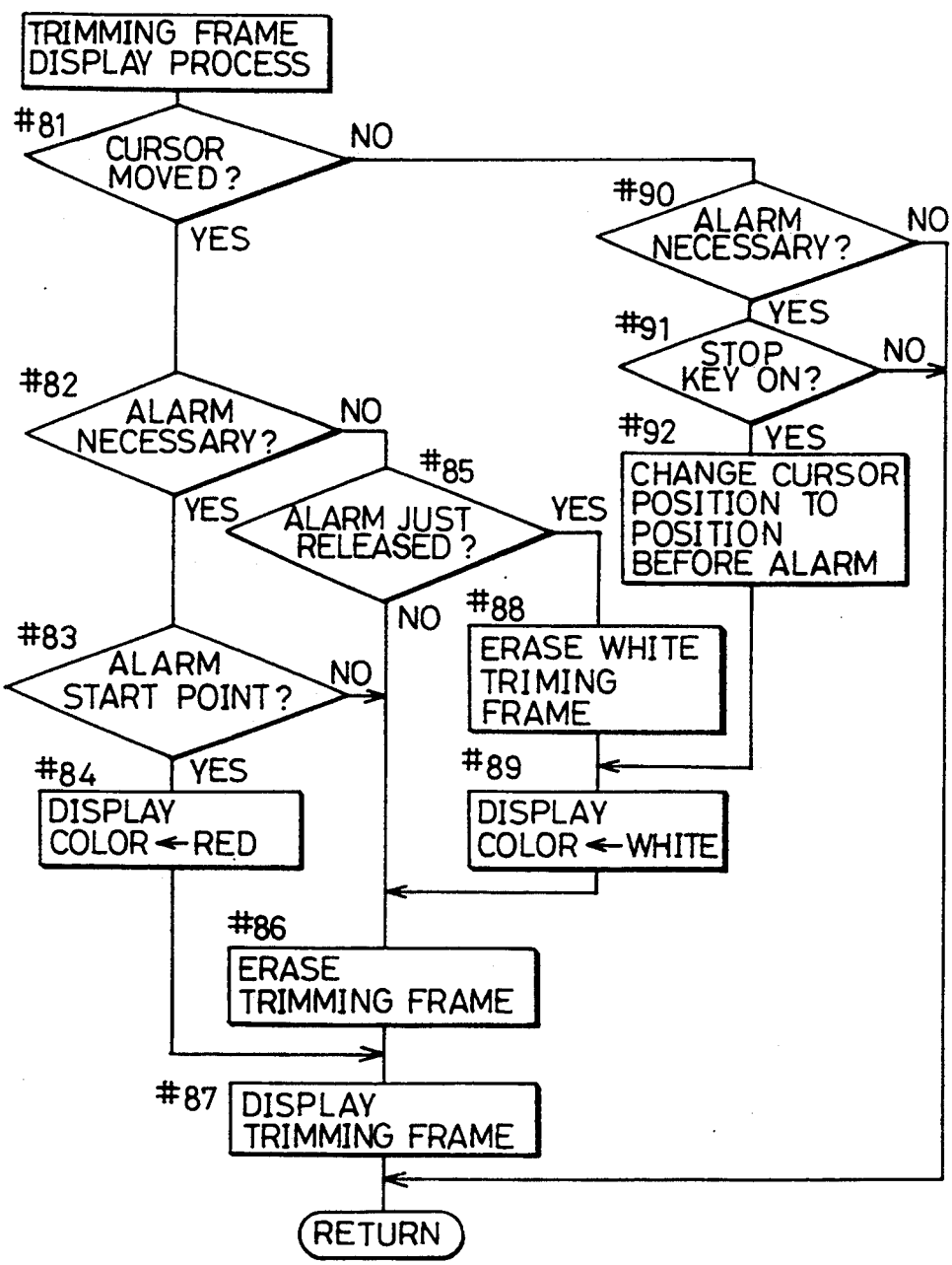
FIG. 42 is a flow chart showing specific contents of the trimming frame display process routine of FIG. 30.

FIG. 42 is a flow chart showing specific contents of the trimming frame displaying process of FIG. 30.

Figure 12B:
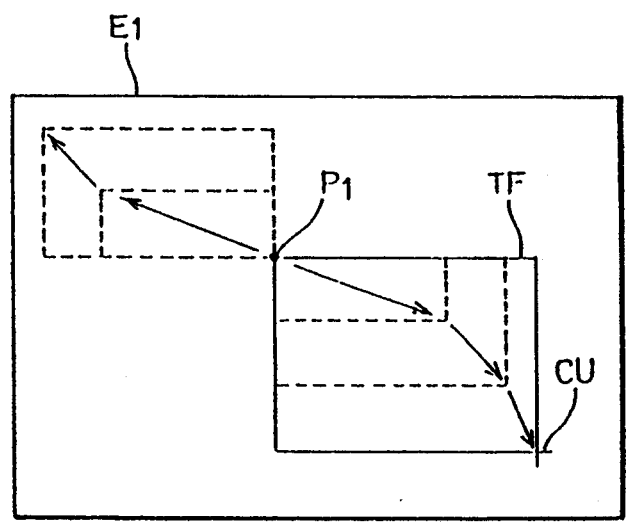

Referring to FIG. 12, whether or not the cursor CU related to designation of the trimming area is moved or not, or whether or not the cursor CU for designating the second point on the diagonal of the trimming frame is moved is determined (step #81).

When the cursor CU has been moved, whether or not the above described alarm display is necessary is determined (step #82).

If the alarm display is not necessary (NO in step #82), then whether or not the alarm has been just canceled in the above described step #70 of the magnification setting process is determined (step #85). More specifically, whether or not the alarm has been necessary before the movement of the cursor CU but the alarm is made unnecessary by the movement of the cursor CU at this time is checked.

If it is NO in step #85, it means that alarm was not given before the movement of the cursor CU. In that case, the displayed trimming frame is erased (step #86). More specifically, in step #86, pixel data (3 bits) corresponding to the displayed trimming frame in the character plane C1 is set to "000". Then a trimming frame corresponding to the second point newly designated by the movement of the cursor CU is displayed (step #87). Generally, the trimming frame is displayed in white (the pixel data of the character plane C1 is set to "111").

If the alarm display is necessary (YES in step #82), then whether or not the alarm is just started is checked (step #83). More specifically, whether or not the alarm has been unnecessary before the movement of the cursor CU and alarm becomes necessary by the present movement of the cursor CU is checked.

If it is YES in step #83, setting is done for changing the color of display of the trimming frame to, for example, red (pixel data of the character plane C1 is "100") for alarm, and then the flow proceeds to the step #87. If it is NO in step #83, then the flow proceeds to the step #86.

More specifically, if the alarm becomes necessary by the movement of the cursor CU at this time, the trimming frame (displayed in white) before the movement of the cursor CU is not erased, while a trimming frame corresponding to the position of the moved cursor CU is newly displayed in red, and therefore two trimming frames having different sizes and different colors are simultaneously displayed. If the alarm has been necessary before the movement of the cursor CU and still it is necessary, the trimming frame (displayed in red) before movement is eased and a new trimming frame is displayed in red.

Therefore, when the cursor CU is moved so that the trimming area is reduced from the state in which the trimming frame is displayed in white, the trimming frame becomes smaller as the cursor is moved, and when the printing magnification M reaches the upper limit, the color of the trimming frame is changed from white to red. If the cursor is moved continuously, a white trimming frame corresponding to the upper limit as well as a smaller red trimming frame are displayed.

Thus the operator can confirm whether or not the trimming area to be designated has an appropriate size with respect to the printing magnification M not only by the presence of the alarm display but also by the color of the trimming frame. In addition, the operator can designate a desired trimming area while recognizing the smallest or largest trimming area (represented by the trimming frame in white) in which the print magnification M is within the prescribed range in the alas displayed state.

If it is YES in step #85, it means that two trimming frames are displayed. In that case, the white trimming frame which has been continuously displayed before the alarm, during the alarm and still displayed at present with the alarm released is erased (step #88). Then setting is done for changing the color of display of the trimming frame to the normal white (step #89), and the flow proceeds to the step #86.

Even if the cursor CU is not moved (NO in step #81), whether or not the alarm display is necessary is determined. If the stop key 5 is turned ON at the state in which alarm is necessary, the cursor position is changed to the position before the alarm (steps #90 to 92) and then the flow proceeds to the step #89.

Namely, if it is YES in step #90, it means that two trimming frames of red and white are displayed on the screen HG, and if the stop key 75 is turned ON in such a case, the red trimming frame is erased in step #86, and in step #87, the trimming frame corresponding to the cursor position changed in the previous step #92 is displayed in white.

Thus the operator can designate simply by turning on the stop key 75 when he or she wishes to designate the smallest or largest trimming area in the prescribed range, while the white trimming frame corresponding to the upper or lower limit of the aforementioned prescribed range and a red trimming frame out of the prescribed range are displayed.

As for the trimming area of the object of printing, the area of the trimming frame corresponding to the position of the cursor CU when the enter key 72 is turned on is set. Therefore, the area corresponding to the red trimming frame may possibly be the trimming area.

In such a case, the printing magnification is set at the upper or lower limit of the prescribed range of the magnification rate as described above, and therefore if the trimming area is too small with respect to the sheet, the trimming image is not expanded to the full sheet size but expanded corresponding to the upper limit (little smaller with respect to the sheet). If the trimming area is too large with respect to the sheet, reduction is done only to the lower limit. Therefore, the trimmed image is fully printed on the sheet, but portions thereof are not printed since these portions are out of the sheet.

Figure 43:
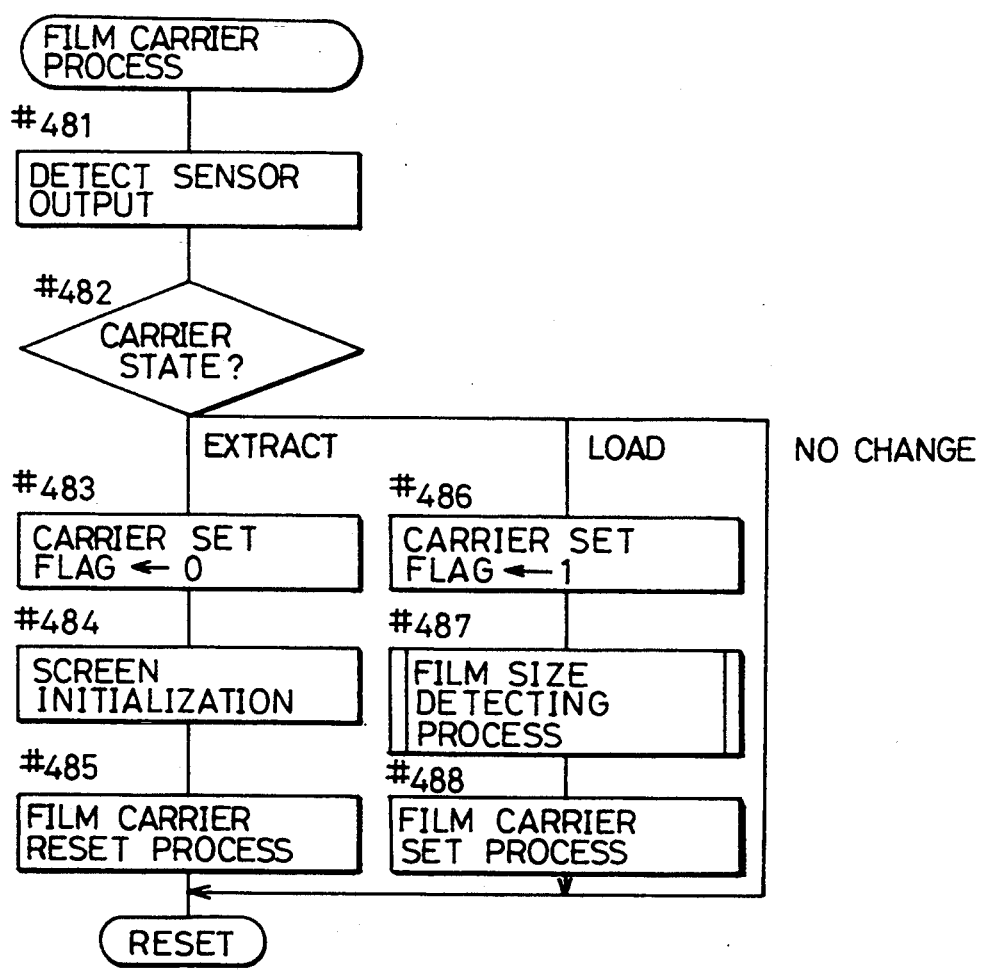
FIG. 43 is a flow chart showing specific contents of the film carrier process routine of FIG. 26.

FIG. 43 is a flow chart showing specific contents of the film carrier process of FIG. 26. The output from a carrier detection sensor 51 is detected (step #481), whether or not the film carrier FC is attached or not is determined (step #482), and the following process is carried out.

When the film carrier FC is drown out from the truck 22, the carrier set flag is reset to initialize the screen HG, and a film carrier reset process having the content previously set by the user setting mode is carried out (steps #483 to 485).

When the film carrier FC is newly loaded, the carrier set flag is set, film size detecting process for adjusting the optical system corresponding to the film size is executed, and then the film carrier set process in which conditions for display and printing are initialized is executed (steps #486 to #488). If the state of attachment/detachment is not changed, no process is done and the flow directly returns.

Figure 44:
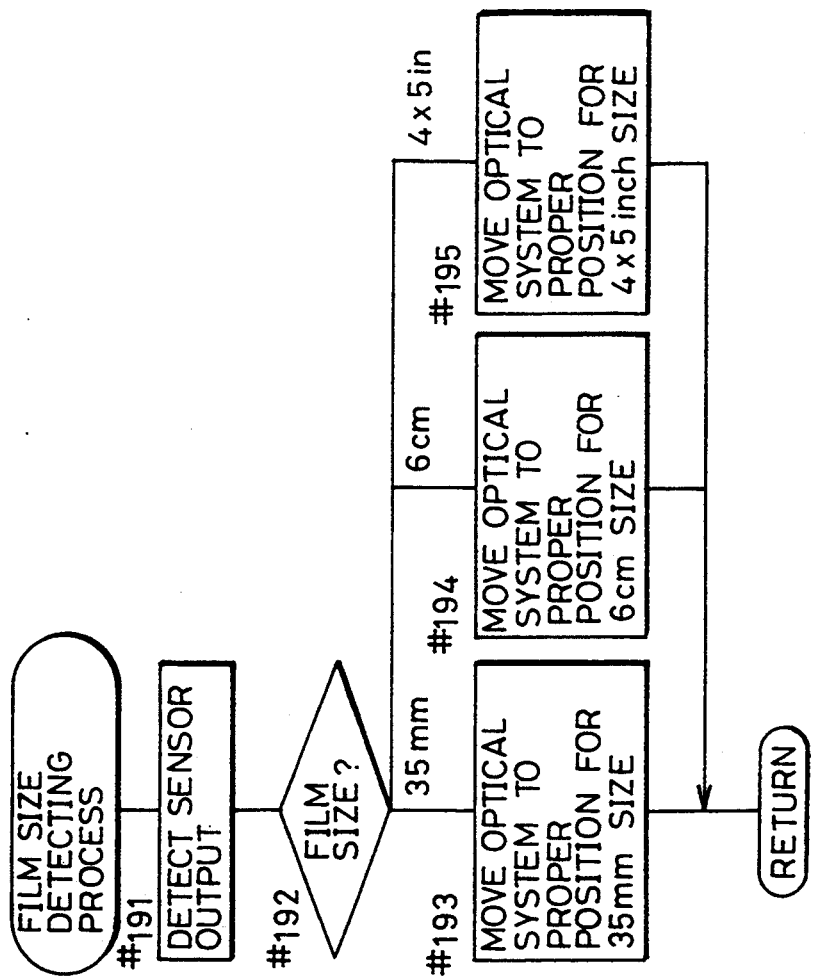
FIG. 44 is a flow chart showing specific contents of the film size detecting process routine of FIG. 43.

FIG. 44 is a flow chart showing specific contents of the film size detecting process of FIG. 43.

Here the film size is detected by the ON/OFF states of the type detecting sensors 52a and 52b (step #191), and optical system for reading (lenses and mirrors) is moved to a prescribed position corresponding to the film size so that an image of a constant size is projected on the image sensor IS (steps #192 to 195).

In the above described embodiments, the track ball 71 and the enter key 72 correspond to the trimming area designating operating means A of the present invention; the control portion 200 corresponds to the trimming area changing means B1, the print magnification calculating means B2, the trimming area setting means B3 and the print control means B4, and the trimming frame displayed in red and the message displaying portion Y1 on the screen HG correspond to the alarm means C, respectively.

In the above described embodiment, the operator can easily know whether or not the trimming area is appropriate by the color of the trimming frame, and therefore erroneous printing can be prevented. In addition, the smallest or largest trimming area in which the printing magnification M is within the prescribed range can be easily designated.

In the above described embodiment, the printing magnification M is described as set as a value in a prescribed range providing a prescribed image quality. However, the range may be enlarged to the functional limit of the optical system and of the magnifying circuitry and the alarm may be given when the printing magnification M goes out of that enlarged range. In that case, the operator selects whether the printing is to be done giving priority to the size of the printed image and the trimming area with a trade off with decreased image quality, or to change the size of the trimming area in order to give priority to the image quality or to stop printing.

In the above described embodiment, an apparatus in which the trimming area is designated on the screen HG has been described as an example. However, the trimming area may be designated by numeral input through ten keys and the like at the screen HG is not always necessary. In addition, an alarm may be given by a sound indicating that the printing magnification M is out of the prescribed range. In addition, magnification in the main scanning direction as well as the subscanning direction may be done by electrical magnification or by optical magnification.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image editing apparatus having a function of trimming an arbitrary area from an image displayed on a screen, comprising:

a display screen which displays the image;

a first controller which displays a trimming frame over the image displayed on said display screen and displays a print frame corresponding to a size of a sheet on which the image surrounded by said trimming frame is formed; and a second controller which displays and enlarges the image surrounded by said trimming frame within said print frame.

2. The image editing apparatus according to claim 1, further comprising:

an eraser which erases a portion of the image outside of the image surrounded by said trimming frame from said display screen.

3. An image editing apparatus having a function of trimming a desired area from an image displayed on a screen, comprising:

an image reader which reads an original image;

a display screen which displays said image obtained by said image reader;

a first controller which display a trimming frame over said displayed image and displays a print frame corresponding to a size of a sheet on which the image surrounded by said trimming frame is formed;

a second controller which displays and enlarges the image surrounded by said trimming frame within said print frame; and a third controller which switches between the display by said first controller and the display by said second controller.

4. An image editing apparatus having a function of trimming an arbitrary area from an image displayed on a screen, comprising:

an image reader which reads an image area, said image area being composed of an original image and a peripheral portion of the original image;

a detector which detects a size of said original image;

a display screen which displays said image area obtained by said image reader; and a controller which sets the trimming function, and which displays a trimming frame corresponding to said size of the original image detected by said detector on said display screen when said trimming function is set, and which moves said trimming frame displayed on the screen.

5. The image editing apparatus according to claim 4, further comprising:
an eraser which erases said peripheral portion, outside of the original image and surrounded by said trimming frame, from said display screen.

6. An image editing apparatus having a function of trimming an arbitrary area from an image displayed on a screen, comprising:
a display screen which displays the image;
a first controller which displays a trimming frame over the image displayed on said display screen, and which changes the size of said trimming frame;
a printing device which prints a magnified area on a sheet, said magnified area being a magnified image surrounded by said trimming frame;
a detector which detects a size of said sheet; and
a second controller which sets a magnification rate of said printing device based on the size of the trimming frame changed by said first controller and the size of said sheet detected by said detector.

7. The image editing apparatus according to claim 6, wherein
said magnification rate set by said second controller is such that the size of the magnified area becomes approximately the same as the size of said sheet.

8. The image editing apparatus according to claim 6, wherein
said printing device changes, when the magnification rate set by said second controller becomes larger than a prescribed magnification rate, the magnification rate to said prescribed magnification rate.

9. The image editing apparatus according to claim 6, further comprising:
a third controller which moves said trimming frame in said display screen.

10. The image editing apparatus according to claim 6, further comprising:
an alarm device which gives an alarm when the magnification rate set by said second controller becomes larger than a prescribed magnification rate.

11. The image editing apparatus according to claim 10, wherein
said prescribed magnification rate is the largest magnification rate which can be realized by said printing device.

12. The image editing apparatus according to claim 11, wherein
when the size of said trimming frame is changed by said first controller and said set magnification rate passes a point at which it is equal to said prescribed magnification rate and becomes larger than said prescribed magnification rate, said alarm device keeps said trimming frame at the time when said set magnification rate is equal to said prescribed magnification rate in a first color on said display screen, and keeps said trimming frame changed thereafter displayed in a second color which is different from said first color.

13. An image editing apparatus having a function of trimming an arbitrary area from an image displayed on a screen, comprising:
a display screen which displays the image;
a first controller which displays a trimming frame over the image displayed on said display screen, and which changes a size of said trimming frame;
a printing device which prints a magnified area on a sheet, said magnified area being a magnified image surrounded by said trimming frame;
a detector which detects a size of said sheet;
a second controller which sets a magnification rate of said printing device based on the size of said sheet detected by said detector and the size of said trimming frame changed by said first controller;
an alarm device which gives an alarm when the magnification rate set by said second controller becomes larger than a prescribed magnification rate; and
a third controller which corrects, when said alarm is given, the size of said trimming frame such that the magnification rate is not larger than said prescribed magnification rate.

14. An image editing apparatus having a function of trimming an arbitrary area from an imaged displayed on a screen, comprising:
a display screen which displays the image:
a printing device which prints a trimmed image on a sheet;
a detector which detects a size of said sheet; and
a controller which sets a trimming function, and which displays a trimming frame corresponding to the detected size of the sheet detected by said detector on said display screen when said trimming function is set, wherein said trimming frame displayed by said display screen has the same aspect ratio as that of the sheet size detected by said detector.

15. The image editing apparatus according to claim 14, further comprising:
a second controller which changes a size of said displayed trimming frame while keeping the aspect ratio constant.

16. The image editing apparatus according to claim 15, further comprising:
a numeral display device which displays the aspect ratio of said displayed trimming frame by numeric value.

* * * * *

UNITED STATES PATENT AND TRADEMARK OFFICE
CERTIFICATE OF CORRECTION

PATENT NO. : 5,430,832
DATED : July 4, 1995
INVENTOR(S) : Shoji Imaizumi, et al.

It is certified that error appears in the above-identified patent and that said Letters Patent is hereby corrected as shown below:

On the Cover Page, in the first line of the title of the patent, change "MAKING" to --HAVING--.

In col. 1, first line (in the first line of the title of the patent), change "MAKING" to --HAVING--.

In col. 2, line 52, after "always", insert --be--.

In col. 3, line 22, change "scrape" to --scope--.

In col. 4, line 48, after "accordance", delete "-".

In col. 8, line 43, change "CPW" to --CPU--.

In col. 13, line 5, change "HGf" to --HG--.

In col. 17, line 6, change "defecting" to --detecting--.

UNITED STATES PATENT AND TRADEMARK OFFICE
CERTIFICATE OF CORRECTION

PATENT NO. : 5,430,832
DATED : July 4, 1995
INVENTOR(S) : Shoji Imaizumi, et al.

It is certified that error appears in the above-identified patent and that said Letters Patent is hereby corrected as shown below:

In col. 18, line 12, change "flat" to --flag--.

In col. 25, line 33, change "an" to --and--.

In col. 28, line 14, change "eased" to --erased--.

In col. 28, line 33, change "alas" to --alarm--.

Signed and Sealed this

Third Day of October, 1995

Attest:

BRUCE LEHMAN

Attesting Officer

Commissioner of Patents and Trademarks